(12) United States Patent
Sawabe et al.

(10) Patent No.: US 6,571,055 B1
(45) Date of Patent: May 27, 2003

(54) COMPRESSED AUDIO INFORMATION RECORDING MEDIUM, COMPRESSED AUDIO INFORMATION RECORDING APPARATUS AND COMPRESSED AUDIO INFORMATION REPRODUCING APPARATUS

(75) Inventors: Takao Sawabe, Tokyo-to (JP); Akihiro Tozaki, Tsurugashima (JP); Kaoru Yamamoto, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/444,719

(22) Filed: Nov. 24, 1999

(30) Foreign Application Priority Data

Nov. 26, 1998 (JP) .......................... 10-336396

(51) Int. Cl.$^7$ ................................ H04N 5/91
(52) U.S. Cl. ..................... 386/96; 386/125; 386/126
(58) Field of Search ................. 386/125–126, 386/46, 95, 112, 124, 96, 97, 98, 99, 104; H04N 5/91

(56) References Cited

U.S. PATENT DOCUMENTS 5,784,528 A * 7/1998 Yamane et al. ............. 386/112

FOREIGN PATENT DOCUMENTS

EP 0 795 870 A 9/1997
EP 0 847 198 A 6/1998

* cited by examiner

Primary Examiner—Vincent Boccio
(74) Attorney, Agent, or Firm—Morgan, Lewis & Bockius LLP

(57) ABSTRACT

On an information recording medium such as a DVD audio, record information is recorded. The record information comprises a plurality of information units each including header information and divided-compressed audio information obtained by dividing compressed audio information so as to include one or a plurality of lead data positioned at a lead of compressed partial audio information. The compressed partial audio information is generated by variable-length-compressing partial audio information obtained by dividing raw audio information and by multiplexing it with compression control information. The compressed audio information is generated by arranging the compressed partial audio information in an order of reproduction. The compression control information includes first control information to control an inputting and outputting operation of the compressed partial audio information with respect to a first buffer, which is used when reproducing the compressed audio information. The header information includes second control information to control an inputting and outputting operation of the divided-compressed audio information with respect to a second buffer, which is used when reproducing the compressed audio information.

17 Claims, 13 Drawing Sheets

COMPRESSED AUDIO INFORMATION RECORDING MEDIUM, COMPRESSED AUDIO INFORMATION RECORDING APPARATUS AND COMPRESSED AUDIO INFORMATION REPRODUCING APPARATUS

BACKGROUND OF THE INVENTION

1. Field of the Invention

The present invention relates to an information recording medium, such as an optical disc or the like, an information recording apparatus for recording record information onto the information recording medium, and an information reproducing apparatus for reproducing the record information recorded on the information recording medium. More particularly, it relates to an information recording medium on which reproduction control information to control a reproduction of the recorded record information is recorded together with the record information, an information recording apparatus for recording the reproduction control information together with the record information onto the information recording medium, and an information reproducing apparatus for reproducing the record information recorded on the information recording medium.

2. Description of the Related Art

In recent years, a technique has been developed, which increases a recording capacity on an information recording medium such as an optical disc or the like and records one entire movie on one sheet of optical disc for example. As a result, a so-called DVD having a recording capacity equal to about seven times as that of a conventional CD (Compact Disc) is put into a practical use.

Then, as this DVD, in addition to a so-called DVD video to record the above-mentioned movie, a so-called DVD audio to record only voice information and tone information other than voice information such as accompaniment information and the like is also put into a practical use (hereafter, the voice information and the tone information are collectively referred to as "audio information").

However, in a conventionally-developed DVD audio, there may be a case that the audio information to be recorded onto the DVD audio (in other words, a disc recorded in a DVD audio format) is non-compressed audio information, for example, such as a so-called PCM (Pulse Code Modulation) and the like. In this case, the non-compression causes the drop of an information amount which can be recorded on one sheet of DVD audio. Thus, this case brings about a problem of a result opposite to tendency of high density.

If a conventionally typical audio information compression method (for example, a so-called MPEG (Moving Picture Experts Group) method and the like) is used as it is to record the compressed audio information onto a DVD audio, since this method is carried out in a non-reversible compression, this brings about a problem of a quality drop of the reproduced audio information.

The compression method and the record format of the DVD audio are integrated inseparably, in many cases. Thus, when reproducing the compressed audio information, it is always required to carry out an operation of detecting the compressed audio information based on the DVD audio record format from the DVD audio and an operation of expanding or decompressing (which is an inversion of compressing) and demodulating or decoding the detected compressed audio information by using a single information reproducing apparatus. Hence, this results in the following problems. That is, it is very difficult to reproduce the audio information at a higher quality as a whole by respectively carrying out the detecting operation and the recovering and demodulating operation by using individual information reproducing apparatuses. Also, a flexibility in a configuration of the information reproducing apparatus is lost.

SUMMARY OF THE INVENTION

It is therefore an object of the present invention to provide an information recording medium, on which raw audio information in a long time duration can be recorded while keeping its original quality in an DVD audio format and which can allow a flexible selection in a structure of an information reproducing apparatus for reproducing the compressed audio information therefrom, and an information recording apparatus for recording the compressed audio information onto the information recording medium, and an information reproducing apparatus for reproducing the compressed audio information recorded on the information recording medium.

The above object of the present invention can be achieved by an information recording medium such as a DVD audio or the like on which record information is recorded, the record information comprising a plurality of information units each including header information and divided-compressed audio information obtained by dividing compressed audio information so as to include one or a plurality of lead data positioned at a lead of compressed partial audio information, the compressed partial audio information being generated by variable-length-compressing partial audio information obtained by dividing raw audio information into a plurality of the partial audio information and by multiplexing the variable-length-compressed partial audio information with compression control information, the compressed audio information being generated by arranging the compressed partial audio information in an order of reproduction. The compression control information includes first control information to control an inputting and outputting operation of the compressed partial audio information with respect to a first buffer, which is used when reproducing the compressed audio information. The header information includes second control information to control an inputting and outputting operation of the divided-compressed audio information with respect to a second buffer, which is used when reproducing the compressed audio information.

According to the information recording medium of the present invention, since the raw audio information is recorded after it is variable-length-compressed, it is possible to record even the raw audio information, whose reproduction time is long, onto the information recording medium.

Therefore, it is possible to record the audio information of long time duration as compared with a case of recording the non-compressed audio information onto the information recording medium.

Further, since the first control information, which is to control the inputting and outputting operation of the compressed partial audio information with respect the first buffer, is included in the compression control information, and since the second control information, which is to control the inputting and outputting operation of the divided-compressed audio information with respect to the second buffer, is included in the header information, it is possible at the time of reproducing the compressed audio information to easily perform (i) the operation of detecting the compressed audio information from the information recording medium and (ii) the operation of expanding or decompressing the detected compressed audio information by respectively using the first control information and the second control information individually, even if those two operations are performed by individual information reproducing apparatuses, each of which has just one of the first buffer and the second buffer.

Therefore, it is possible to easily promote the cost reduction and the simplification in the structure of the information reproducing apparatus, by performing the detection of the compressed audio information and the decoding process (e.g., expanding or decompressing, and demodulating processes) by use of the individual information reproducing apparatuses.

In one aspect of the information recording medium of the present invention, the first control information comprises: first input time information multiplexed for each of all the compressed partial audio information and indicating a time on a reproduction time axis of the compressed audio information when the compressed partial audio information, to which the first control information belongs, is to be inputted into the first buffer; and first output time information multiplexed for each of at least one or a plurality of the compressed partial audio information and indicating a time on the reproduction time axis of the compressed audio information when the compressed partial audio information, to which the first control information belongs, is to be outputted from the first buffer.

According to this aspect, it is possible to precisely control the inputting and outputting operation for the compressed partial audio information with respect to the first buffer, at the time of reproducing the compressed audio information.

In another aspect of the information recording medium of the present invention, the second control information comprises: second input time information indicating a time on a reproduction time axis of the record information when the divided-compressed audio information, which is included in the information unit together with the second control information, is to be inputted into the second buffer; second output time information indicating a time on the reproduction time axis of the record information when the compressed partial audio information, to which first lead data among lead data each positioned at a lead of one or a plurality of the compressed partial audio information included in the divided-compression audio information included in the information unit together with the second control information belongs, is to be outputted from the second buffer; and third output time information indicating a time on the reproduction time axis of the record information when each of the compressed partial audio information is to be outputted from the first buffer.

According to this aspect, it is possible to precisely control the inputting and outputting operation for the divided-compressed audio information and the compressed partial audio information with respect to the second buffer, at the time of reproducing the compressed audio information.

The above object of the present invention can be also achieved by an information recording apparatus for recording record information onto an information recording medium, the record information comprising a plurality of information units each including header information and divided-compressed audio information obtained by dividing compressed audio information so as to include one or a plurality of lead data positioned at a lead of compressed partial audio information, the compressed partial audio information being generated by variable-length-compressing partial audio information obtained by dividing raw audio information into a plurality of the partial audio information and by multiplexing the variable-length-compressed partial audio information with compression control information, the compressed audio information being generated by arranging the compressed partial audio information in an order of reproduction. The information recording apparatus is provided with: a compressed audio information generating device such as a signal process unit or the like for generating the compressed audio information; a first control information generating device such as a signal process unit or the like for generating first control information to control an inputting and outputting operation of the compressed partial audio information with respect to a first buffer, which is used when reproducing the compressed audio information; a second control information generating device such as a signal process unit or the like for generating second control information to control an inputting and outputting operation of the divided-compressed audio information with respect to a second buffer, which is used when reproducing the compressed audio information; and a recording device such as a mastering device or the like for recording the first control information and the second control information together with the compressed audio information onto the information recording medium after multiplexing the first control information in the compression control information and multiplexing the second control information in the header information.

According to the information recording apparatus of the present invention, since the raw audio information is recorded after it is variable-length-compressed, it is possible to record even the raw audio information, whose reproduction time is long, onto the information recording medium.

Therefore, it is possible to record the audio information of long time duration as compared with a case of recording the non-compressed audio information onto the information recording medium.

Further, since the first control information, which is to control the inputting and outputting operation of the compressed partial audio information with respect the first buffer, is included in the compression control information, and since the second control information, which is to control the inputting and outputting operation of the divided-compressed audio information with respect to the second buffer, is included in the header information, it is possible at the time of reproducing the compressed audio information to easily perform (i) the operation of detecting the compressed audio information from the information recording medium and (ii) the operation of expanding or decompressing the detected compressed audio information by respectively using the first control information and the second control information individually, even if those two operations are performed by individual information reproducing apparatuses, each of which has just one of the first buffer and the second buffer.

Therefore, it is possible to easily promote the cost reduction and the simplification in the structure of the information reproducing apparatus, by performing the detection of the compressed audio information and the decoding process by use of the individual information reproducing apparatuses.

The above object of the present invention can be also achieved by an information reproducing apparatus for reproducing the compressed audio information in accordance with the first control information and the second control information, from the above described information recording medium of the present invention. The information reproducing apparatus is provided with: a detecting device such as an optical pickup or the like for detecting the compressed audio information, the first control information and the second control information respectively from the information recording medium; the first buffer such as a FIFO (First In First Out) memory or the like; the second buffer such as an input buffer or the like; a controlling device such as a system controller or the like for controlling the second buffer to temporarily store and output the divided-compressed audio information in accordance with the detected second control information, and controlling the first buffer to temporarily store and output the compressed partial audio information outputted from the second buffer in accordance with the detected first control information; and a reproducing device such as a core decoder or the like for applying an expanding process corresponding to the compressing process with respect to the compressed-partial audio information outputted from the first buffer to thereby output the partial audio information.

According to the information reproducing apparatus of the present invention, since the raw audio information is recorded after it is variable-length-compressed, it is possible to reproduce even the raw audio information, whose reproduction time is long, from the information recording medium.

Further, since the first control information, which is to control the inputting and outputting operation of the compressed partial audio information with respect the first buffer, is included in the compression control information, and since the second control information, which is to control the inputting and outputting operation of the divided-compressed audio information with respect to the second buffer, is included in the header information, it is possible at the time of reproducing the compressed audio information to easily perform (i) the operation of detecting the compressed audio information from the information recording medium and (ii) the operation of expanding or decompressing the detected compressed audio information by respectively using the first control information and the second control information individually, even if those two operations are performed by individual information reproducing apparatuses, each of which has just one of the first buffer and the second buffer.

Therefore, it is possible to easily promote the cost reduction and the simplification in the structure of the information reproducing apparatus, by performing the detection of the compressed audio information and the decoding process by use of the individual information reproducing apparatuses.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments of the present invention will be explained below with reference to the drawings. The following embodiments are the embodiments in which the present invention is applied to the above-mentioned DVD audio, an information recording apparatus as a disc manufacturing apparatus for manufacturing the DVD audio, and an information reproducing apparatus for reproducing the audio information recorded on the DVD audio.

In the following embodiments, an example of each of components in claims shown on a left side of a following list is constituted by respective one of components shown on a right side of the following list.

| | |
|---|---|
| Partial Audio Information | Audio Frame |
| Compression Control Information | Restart Header and Sync Header |
| Compressed Portion Audio Information | Access Unit |
| Compressed Audio Information | Compressed Stream |
| Divided Compressed Audio Information | Division Data (Compressed Stream Data in Packet) |
| Header Information | Hack Header and Packet Header |
| Information Unit | Audio Pack (Sector) |
| First Buffer | FIFO memory |
| Second Buffer | Input Buffer |
| First Control Information | FIFO Input Time and FIFO Output Time |
| Second Control Information | DTS (Decoding Time Stamp) and SCR (System Clock Reference) |
| First Input Time Information | FIFO input time |
| First Output Time Information | FIFO output time |
| Second Input time information | SCR |
| Second Output time information | DTS |
| Third Output time information | PTS (Presentation Time Stamp) |

(I) Embodiment of Information Recording Medium

At first, a physical configuration and a logical configuration of the above-mentioned DVD audio that is the embodiment of the information recording medium according to the present invention are described with reference to FIGS. 1 to 3.

Figure 1:
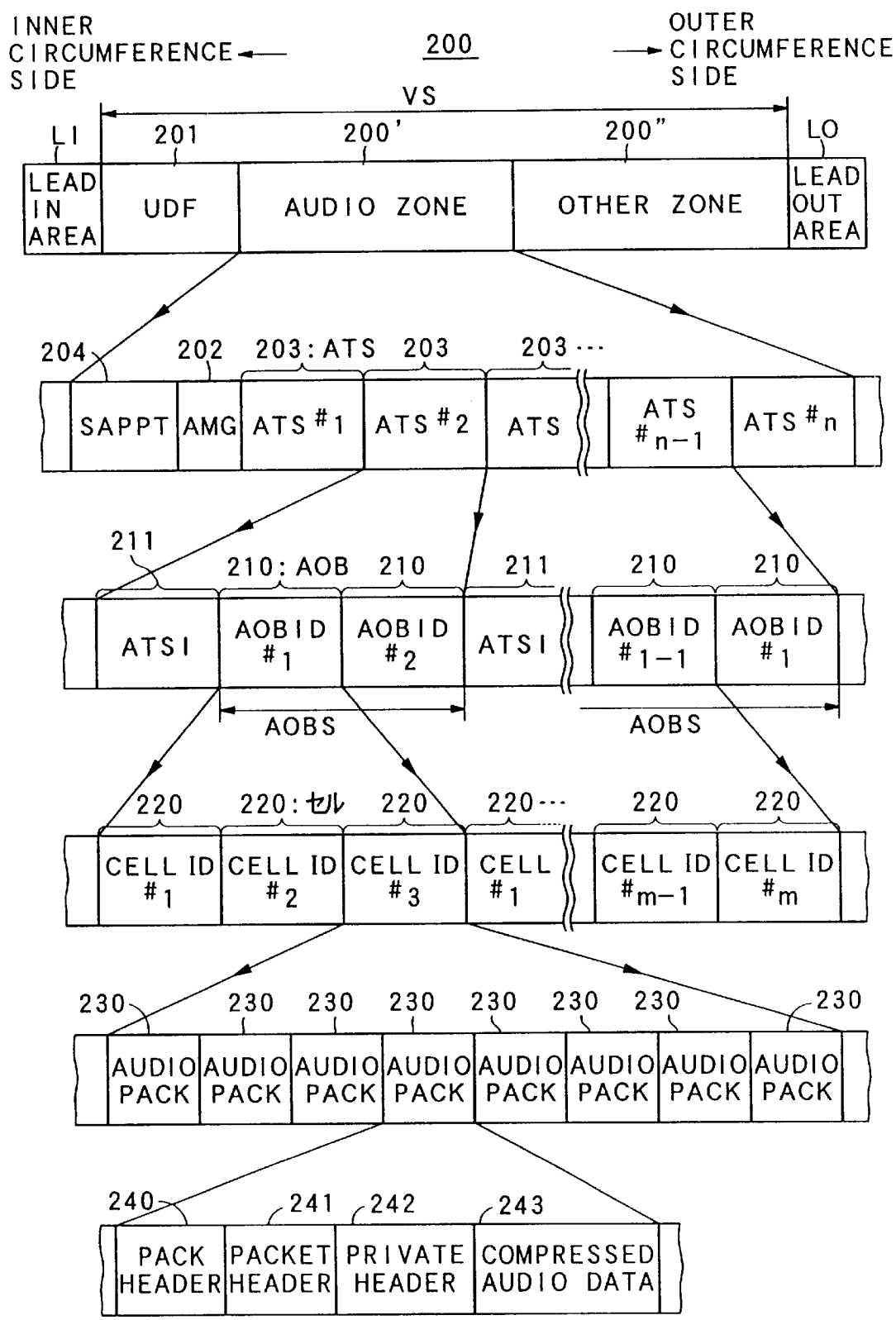
FIG. 1 is a diagram showing a physical format of a DVD audio in an embodiment.
Figure 2:
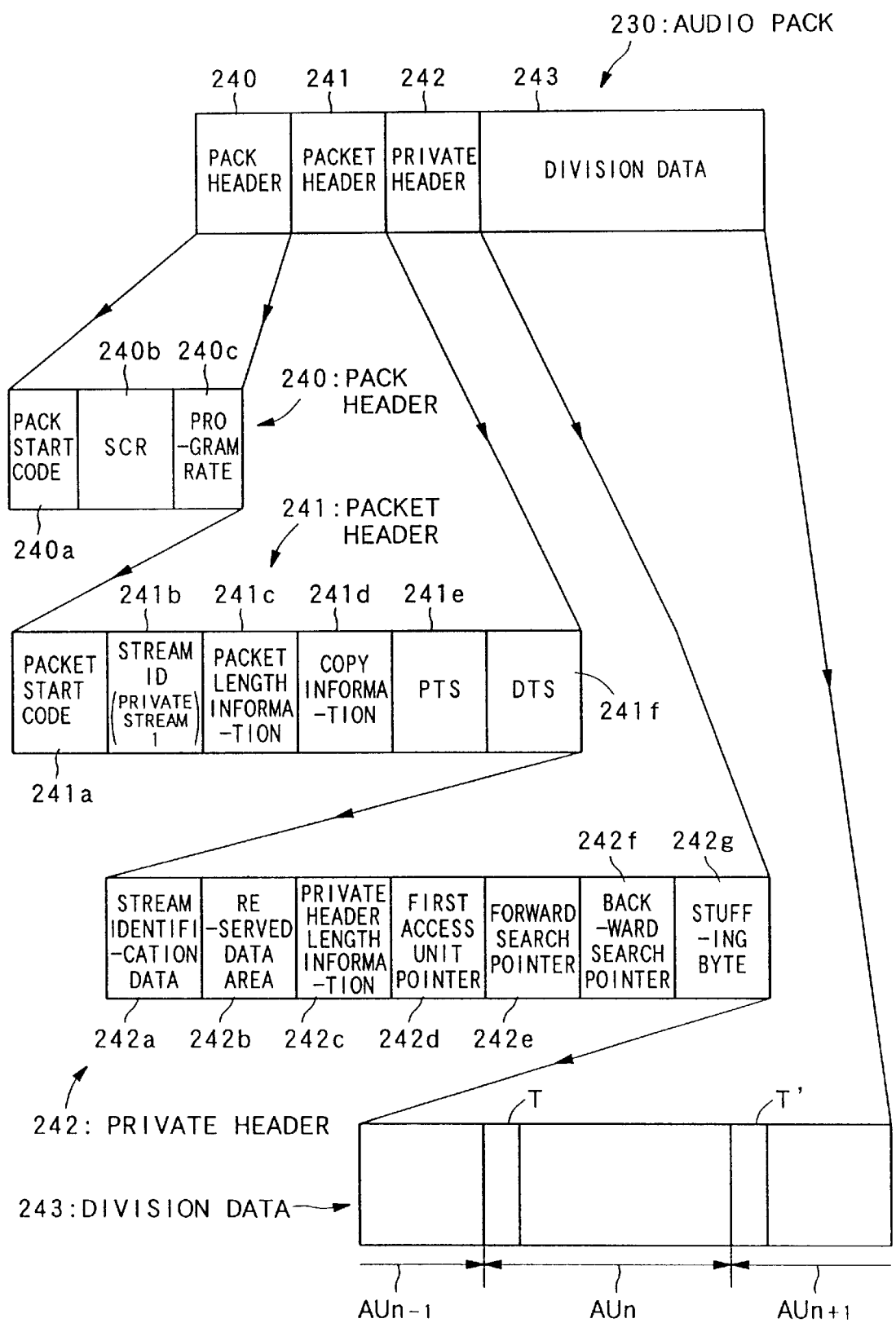
FIG. 2 is a diagram showing a physical format of an audio pack.

FIG. 1 and FIG. 2 are diagrams showing a record format of the DVD audio. FIG. 3 is a diagram showing a logical format of the DVD audio.

At first, the record format (i.e., the physical record format) of audio information on the DVD audio is described with reference to FIG. 1 and FIG. 2.

As shown in FIG. 1, a DVD audio 200 serving as the information recording medium in the embodiment has a lead-in-area LI on an innermost circumference side and also has a lead-out-area LO on an outermost circumference side. A volume space VS is formed between them.

A UDF (Universal Disc Format) 201 including information to manage a format of the audio information recorded on the DVD audio 200, at least one audio zone 200' actually including the audio information and an other zone 200" including information other than the audio information are formed in this order from the side of the lead-in-area LI, within the volume space VS.

Next, the audio information included within the audio zone 200' is divided into a plurality of ATSs (Audio Title Sets) 203 (ATS #1 to ATS #n) each having an ID (Identification Number). Moreover, an SAPPT (Simple Audio Play Pointer Table) 204 that is information required to reproduce the audio information (to which the variable length compression is applied in the actual DVD audio 200, as described later) through two channels (this SAPPT 204 is always recorded within all the DVD audios 200 having the audio zone 200') and an AMG (Audio Manger) 202 are recorded from a lead of the audio zone 200', in portions other than the ATS 203 within the audio zone 200'.

The information with regard to the whole audio information recorded on the DVD audio 200 is recorded in the AMG 202, for example, such as a menu to prompt an audience to select an item, information to protect an illegal copy, an access table to reproduce each title and the like.

Here, the arrangement of the UDF 201, the other zone 200", the SAPPT 204 and so on may not be in the order shown in FIG. 1.

Next, one ATS 203 is provided with a plurality of AOBs (Audio Objects) 210 each having an ID number with an ATSI (Audio Title Set Information) 211 as a lead thereof.

Here, a portion constituted by the plurality of AOBs 210 is typically referred to as an ABO set (AOBS). This AOB set is intended to sort the substantial portion of the audio information from other control information.

Next, the information of ATSPGCI (Audio Title Set Program Chain Information) implying various information with regard to a program chain that is a logical division constituted by a combination of a plurality of cells (which will be described later) and the like are recorded in the ATSI 211 recorded at a lead of the ATS 203.

Each AOB 210 contains the substantial portion of the audio information. One AOB 210 is provided with a plurality of cells 220 each having an ID number.

Next, one cell 220 is composed of a plurality of audio packs 230 (which corresponds to a sector as a unit of information recording), each of which is packed and implies a bottom layer of a hierarchical structure. Here, in the audio pack 230, the variable-length-compressed audio information to be recorded onto the DVD audio 200 is packed for each predetermined size.

The one cell 220 may contain real time information pack including text information, a BPM (Beat Per Minutes) and rhythm information etc., other than the above-mentioned audio pack 230, instead of one or more audio packs 230.

Next, one audio pack 230 contains from a lead thereof a pack header 240, a packet header 241 and a private header 242, as the header information, as well as division data 243 which is the substantial portion of the compressed audio information.

At this time, as shown in FIG. 2, the information included in the pack header 240 actually includes: a pack start code 240a indicative of a lead of a pack; an SCR (System Clock Reference) 240b according to the present invention which implies a time on a reproduction time axis when a transfer of the audio information included in the audio pack 230 from a demultiplexer to an input buffer in a later-described information reproducing apparatus is started; and a program rate 240c indicative of a transfer rate of a program stream defined in accordance with the MPEG method.

As shown in FIG. 2, information included in a packet header 241 actually includes: a packet start code 241a indicative of a lead of a packet; a stream ID 241b to identify that the information recorded following the packet header 241 is a private stream 1 defined in accordance with the MPEG method; packet length information 241c indicative of a length of the packet itself; copy information 241d that is information for the sake of copy control and the like; a PTS 241e for implying a time on a reproduction time axis when a core decoder in the later-described information reproducing apparatus starts to output a later-described first access unit within the division data 243 recorded following the packet header 241 and the private header 242, to the external portion; and a DTS 241f according to the present invention which implies a time on a reproduction time axis when an input buffer in the later-described information reproducing apparatus starts to transfer the access unit to the decoder.

As shown in FIG. 2, the information included in the private header 242 actually includes: sub-stream identification data 242a which is a flag to identify that the information recorded following the private header 242 is the compressed audio information; reserved data areas 242b and 242g; private header length information 242c indicative of a length of the private header 242 itself; a first access unit pointer 242d indicative of a record position on the DVD audio 200 of a first access unit within the division data 243; a forward search pointer 242e indicative of a record position on the DVD audio 200 of a packet to be reproduced 1 sec. (second) before the first access unit; a backward search pointer 242f indicative of a record position on the DVD audio 200 of a packet to be reproduced 1 sec. after the first access unit; and a stuffing byte 242h, which is dummy data to adjust the length of the private header 242 itself.

Moreover, for example, access units $AU_{n-1}$ to $AU_{n+1}$ are included in the division data 243, as shown in FIG. 2. Here, the structure within the division data 243 is not always as shown in FIG. 2. However, it has the configuration that one lead data T of the access unit AU is always included in each of all division data 243 except for the division data 243 included in an end audio pack 230 of a later-described cell 220.

In FIG. 2, the access unit $AU_{n-1}$ is an access unit starting from the middle (i.e., the former other portion of the access unit $AU_{n-1}$ is recorded in the audio pack 230 immediately before). Also, the $AU_n$ is an access unit completed within this audio pack 230. The lead data T is the lead data of the access unit $AU_n$. Moreover, the access unit $AU_{n+1}$ is an access unit ended in the middle (i.e., the latter portion of the access unit $AU_{n+1}$ is recorded in the audio pack 230 immediately after). The lead data T' is the lead data of the access unit $AU_{n+1}$.

Also, the access unit $AU_n$ is a first access unit (which is an access unit AU firstly appearing within the audio pack 230 among the access units AU including the lead data).

In the above-mentioned record format of the hierarchical structure shown in FIG. 1 and FIG. 2, each division can be freely set to record the information by a producer or author of the audio information to be recorded within the DVD audio 200 (hereafter, who is merely referred to as an "author") in correspondence with his or her will. Then, various eventful reproductions can be carried out by the reproduction on the basis of a later-described logical structure for each division.

Next, a logical format (logical structure) constituted by a combination of the information recorded in accordance with the physical divisions shown in FIG. 1 and FIG. 2 will be described below with reference to FIG. 3.

Figure 3:
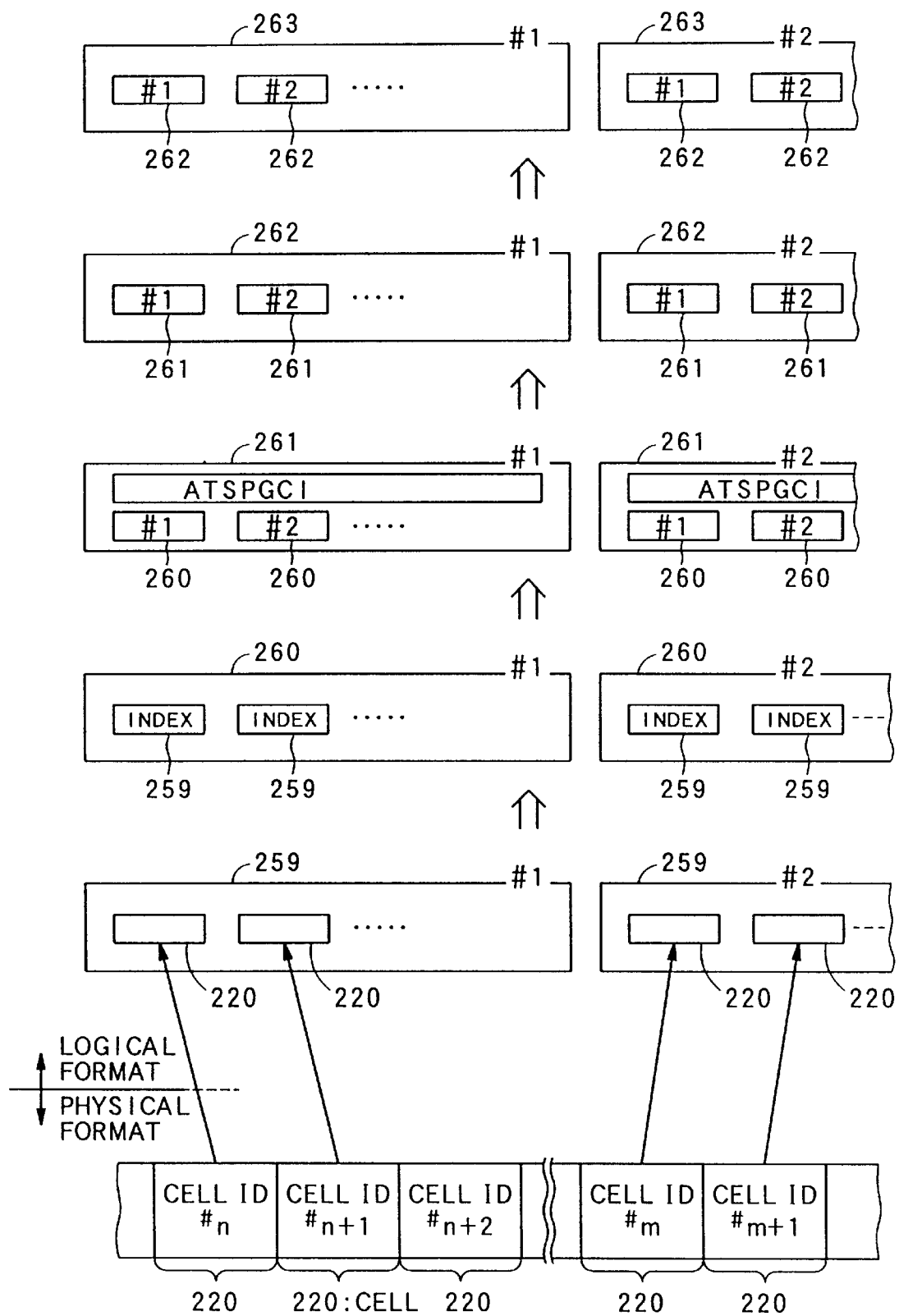
FIG. 3 is a diagram showing a logical format of the DVD audio in the embodiment.

In the logical structure shown in FIG. 3, the audio information is not actually recorded on the DVD audio 200 under such a structure. That is, the audio information is recorded on. the DVD audio 200 by the physical formats shown in FIG. 1 and FIG. 2. Information to reproduce this audio information under the logical structure shown in FIG. 3 is recorded on the SAPPT 204, the AMG 202, the ATSI 211 and the like by the physical structures shown in FIG. 2.

For convenience of explanation, it is explained from a lower hierarchy in FIG. 3. Indexes 259 are logically constituted by selecting and combining one or a plurality of cells (or partial music compositions) 220 from among the physical structures shown in FIG. 1. At this time, the index 259 can be treated as a music composition number and implies a minimum unit that can be accessed by a selection of the audience.

Next, one track 260 is logically constituted by one or a plurality of indexes 259. This track 260 is an information unit corresponding to one music composition. Then, the audience can select any track (i.e., any music composition) 260 to directly access it.

Here, the number of one cell 220 is treated as a cell ID number (indicated as a cell ID# in FIG. 1) when the cell 220 is treated by the physical format shown in FIG. 1, and treated as a cell number in a note order in a later-described ATSPGCI when the cell 220 is treated by the physical format shown in FIG. 3.

Also, the track 260 is an information unit including a plurality of cells 220, and is a set of the cells 220 having a certain common attribute and the like. That is, the attributes of all the cells 220 within the track 260 are all identical. Moreover, all the cells 220 included in the track 260 are recorded adjacently to each other, within the same area on the DVD audio 200.

Next, one title 261 is logically constituted by combining one or a plurality of tracks 260. At this time, the title 261 itself is never recognized by the audience as the unit of the access. Thus, each title 261 cannot be arbitrarily accessed, for example, by specifying the number of the title 261.

In the DVD audio 200, attributes of the respective tracks 260 constituting the title 261 can be defined independently of each other, from among a maximum of eight kinds of attributes. That is, it is possible to change the attributes as the audio information, such as the number of channels, a quantization method, a sampling frequency and the like, for each track 260.

The above-mentioned ATSPGCI is defined at a unit of this title 261. The ATSPGCI contains: the attributes of the respective tracks 260; a reproduction order of the cells 220 for each track 260 when each track 260 is reproduced; an address that is a record position on the DVD audio 200 of each cell 220; the number of the lead cell 220 to be reproduced in one track 260; a reproduction method; various commands; and the like. One title 261 contains the substantial audio information as a combination of the tracks 260 (in other words, as a combination of the cells 220), in addition to the above-mentioned ATSPGCI.

Next, one above-mentioned title group 262 is logically constituted by one or a plurality of titles 261. This title group 262 is a maximum unit which can be accessed by the audience. Then, a maximum of nine title groups 262 can be defined in a later-described volume 263.

Here, the title group 262 is provided with one or a plurality of titles 261 assembled on the basis of a certain constant relationship. All the titles 261 within the title group 262 are reproduced in succession. Actually, for example, a music composition or song set of a certain singer, a certain musical composer and the like can be assembled as one title group 262.

Next, one above-mentioned volume 263 is logically constituted by one or a plurality of title groups 262. This volume 263 is an information unit corresponding to one side of one sheet of DVD audio disc.

Here, the substantial audio information included in the one title 261 shown in FIG. 3 is recorded within any one of ATSs 203 shown in FIG. 1 on the DVD audio 200.

A music composition which the audience listens to is generated when the author specifies the information division within each audio information divided or sorted in the physical structure shown in FIG. 1, in accordance with the logical format as mentioned above.

(II) Embodiment of Information Recording Apparatus

An embodiment of an information recording apparatus for manufacturing the DVD audio 200 which records thereon the compressed audio information having the configurations shown in FIGS. 1 to 3 will be described below with reference to FIGS. 4 to 8.

Figure 4:
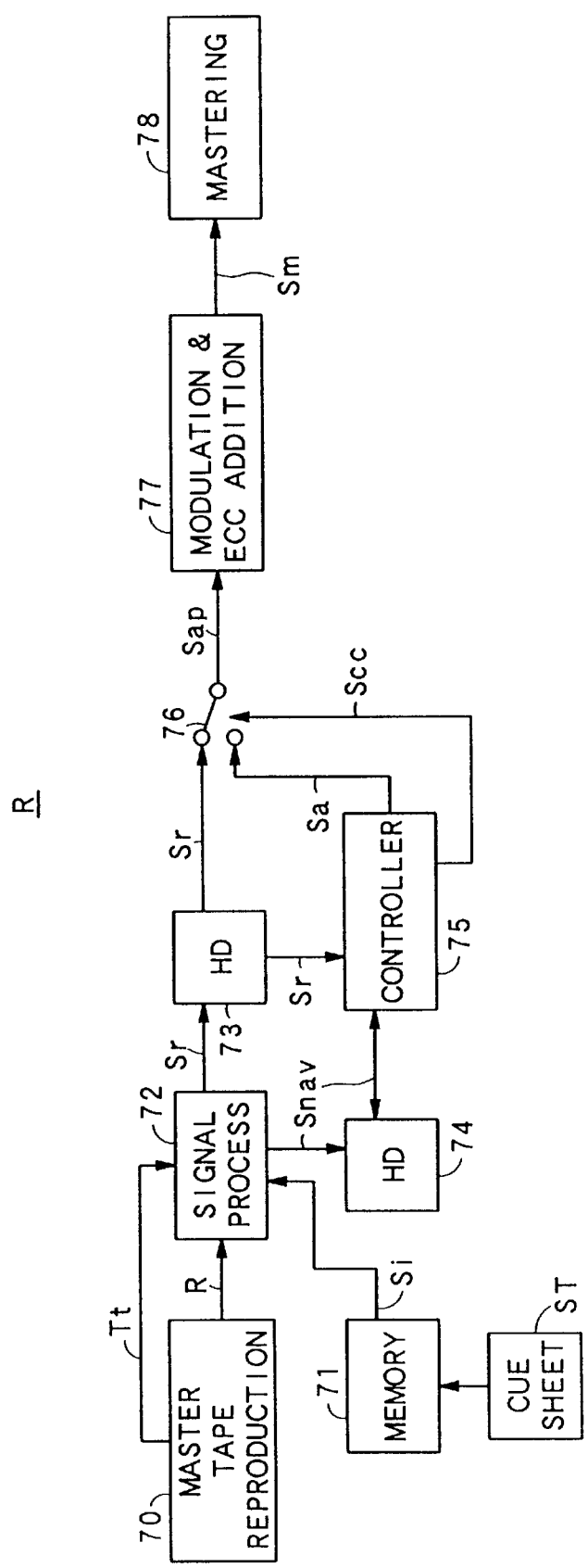
FIG. 4 is a block diagram showing a schematic configuration of an information recording apparatus in the embodiment.
Figure 5:
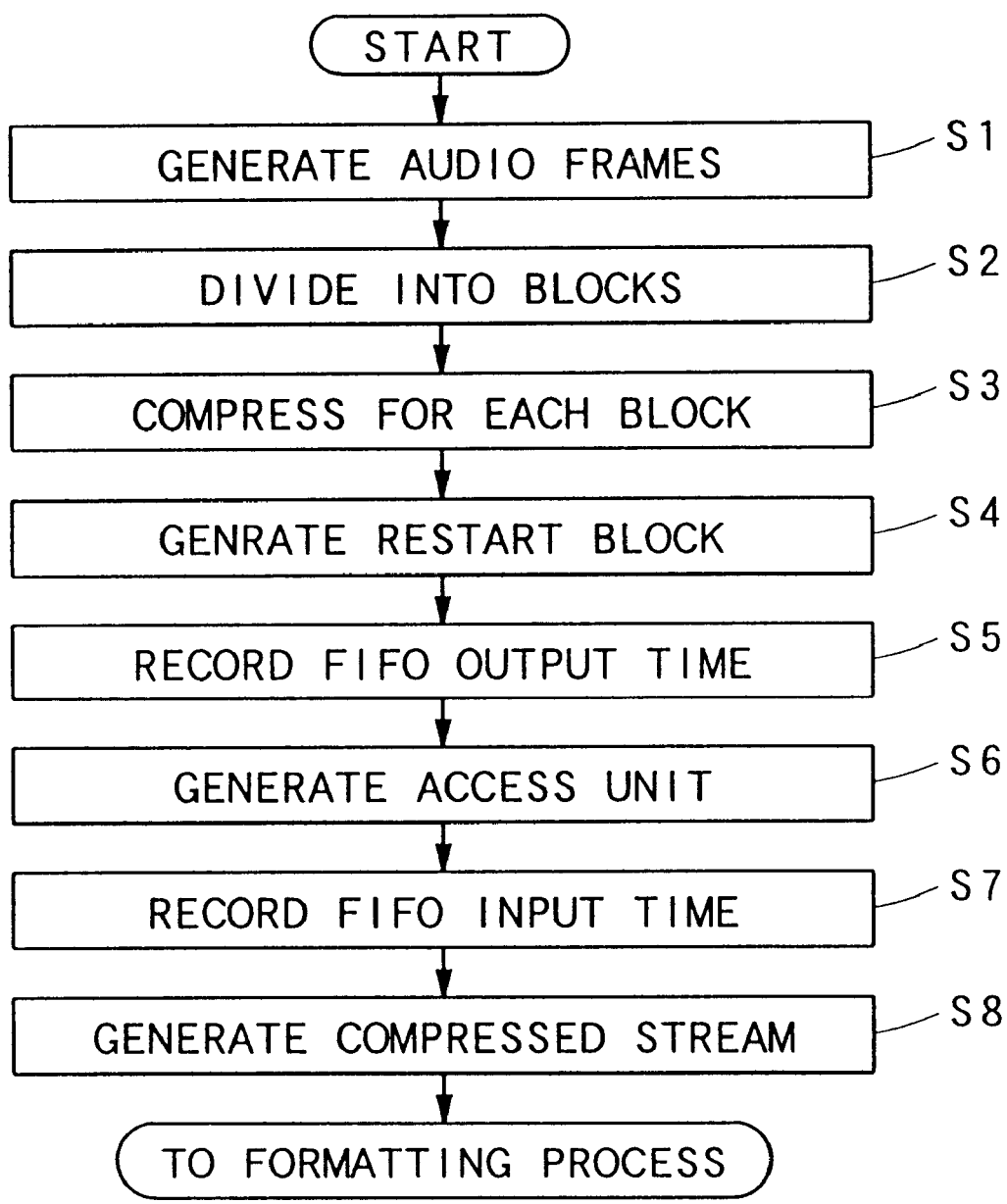
FIG. 5 is a flowchart showing a process of compressing an audio information in the embodiment.
Figure 6:
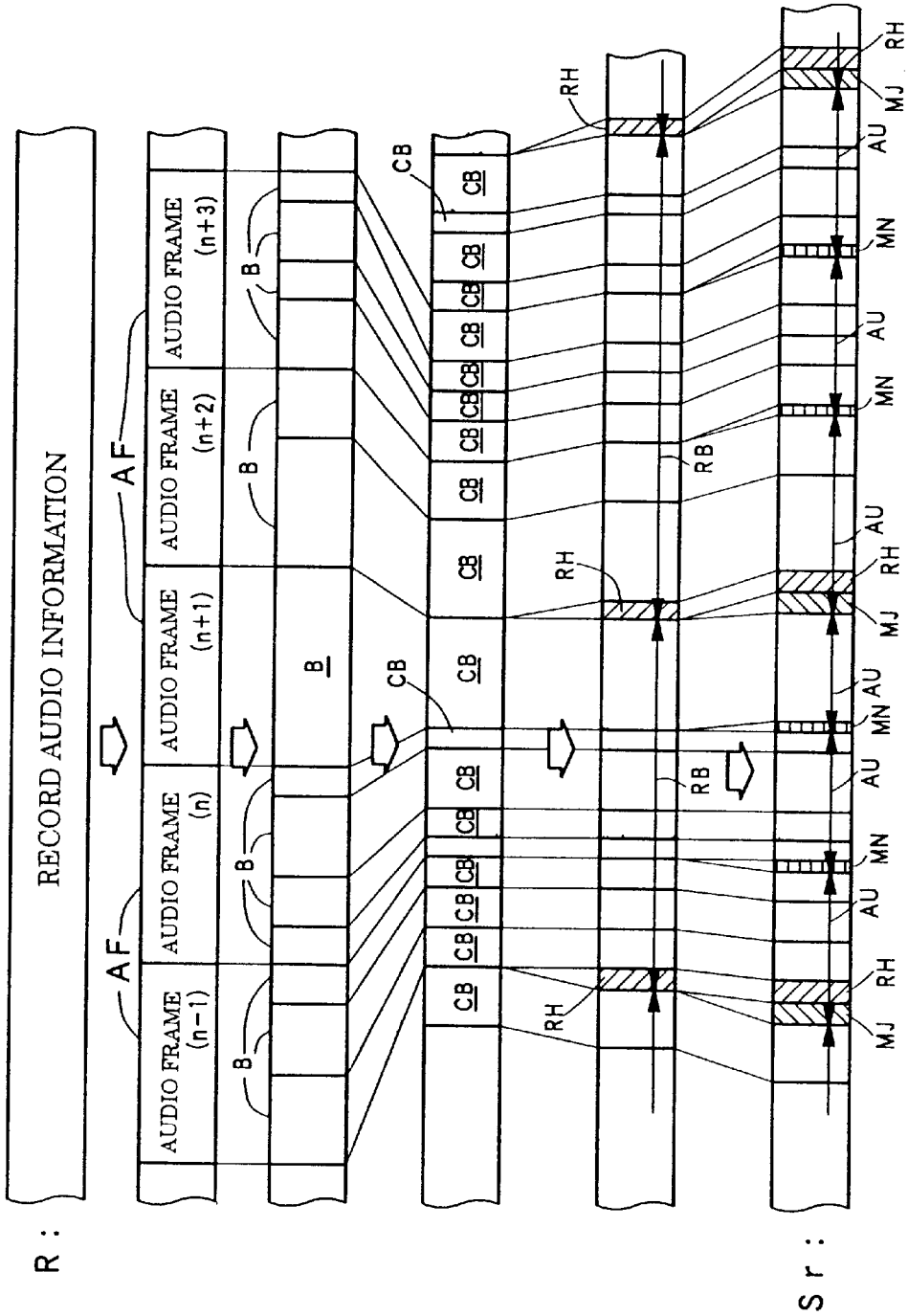
FIG. 6 is a diagram explaining the process of compressing the audio information in the embodiment.
Figure 7:
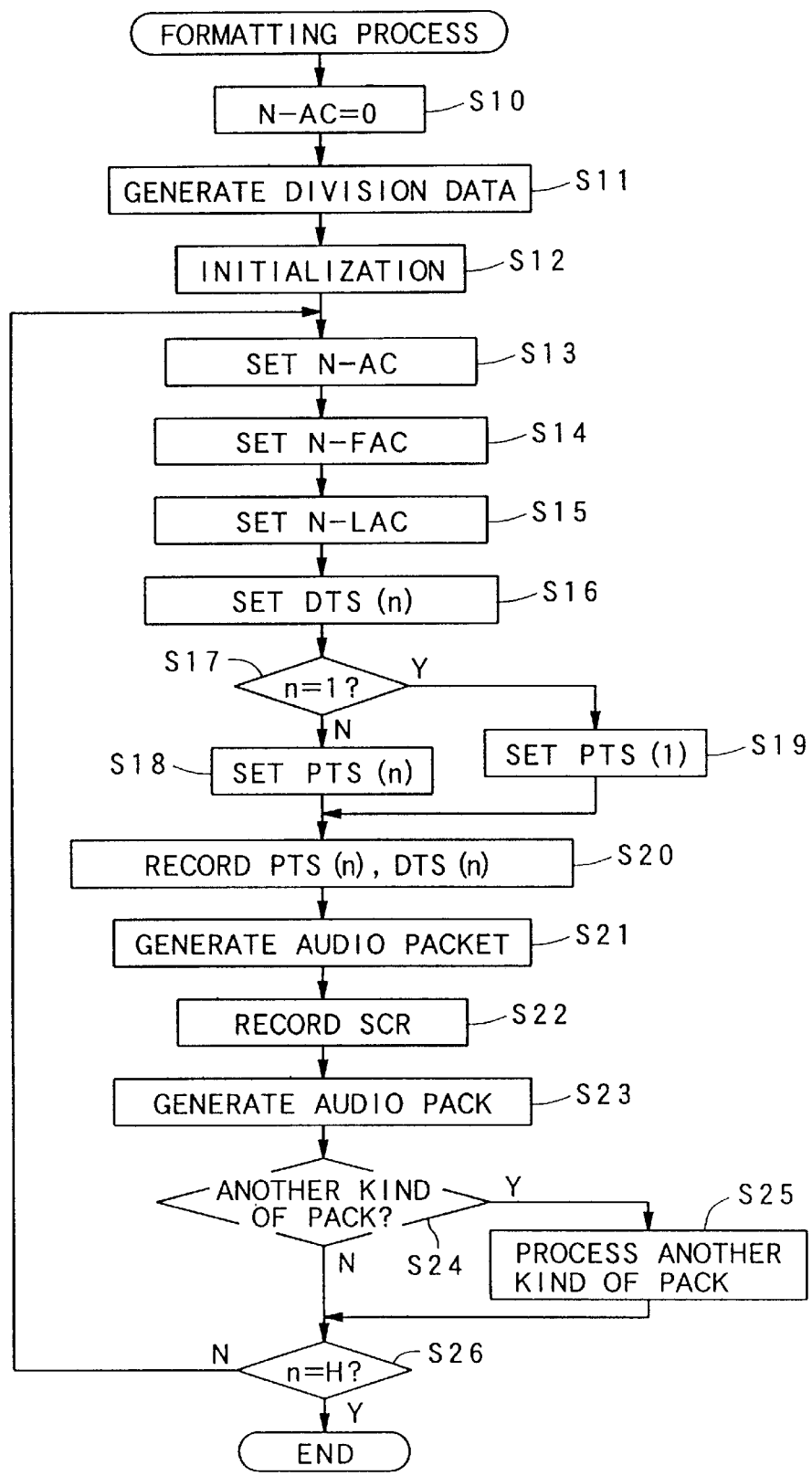
FIG. 7 is a flowchart showing an authoring process of a compressed stream in the embodiment.
Figure 8:
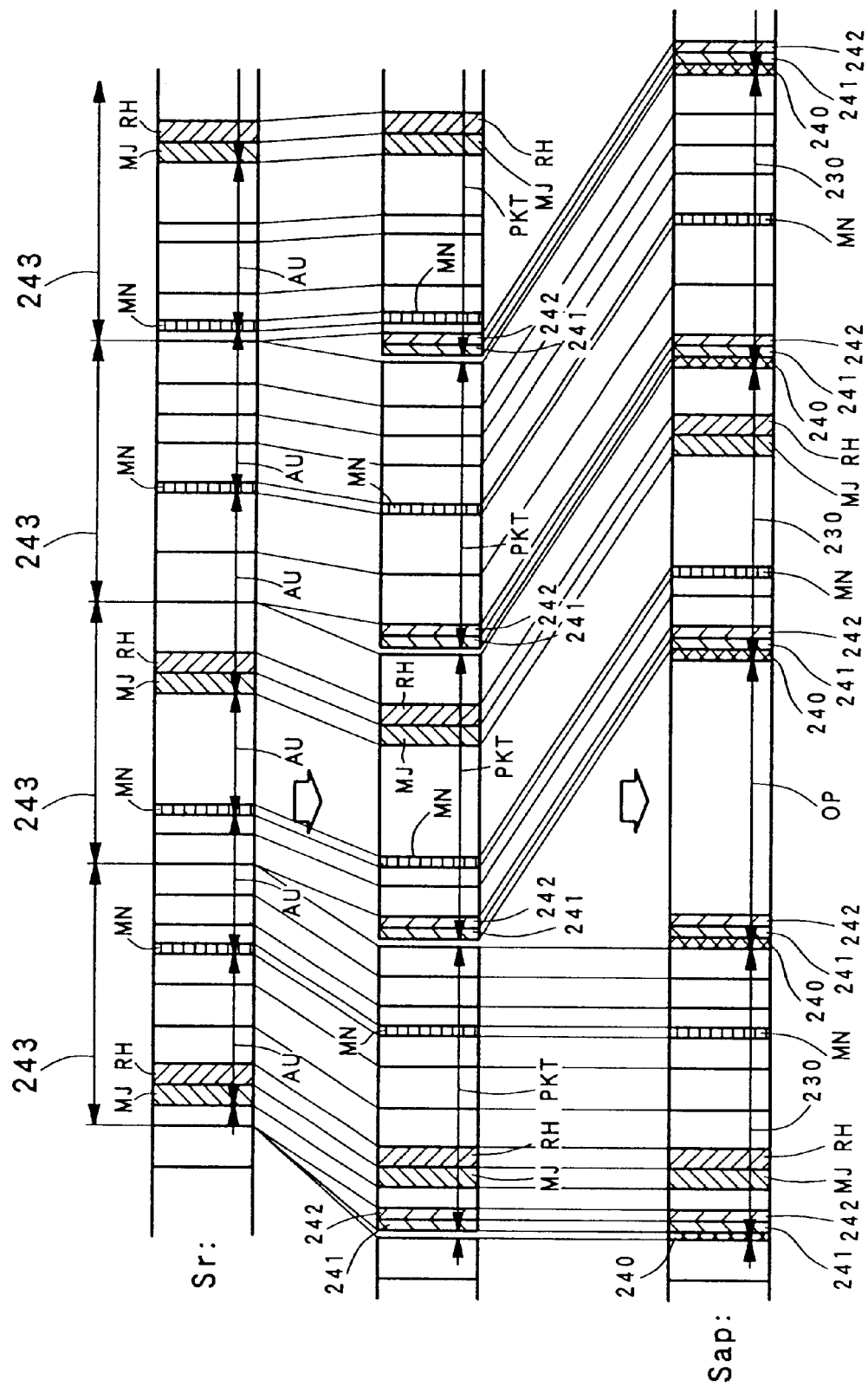
FIG. 8 is a diagram showing the authoring process of the compressed stream information in the embodiment.

FIG. 4 is a block diagram showing the schematic configuration of the information recording apparatus of the embodiment. FIG. 5 is a flowchart showing the process of generating the compressed audio information out of the non-compressed audio information (hereinafter, the compressed audio information is called as a "compressed stream"). FIG. 6 is a diagram explaining this process of generating the compressed stream. FIG. 7 is a flowchart showing the process of converting the compressed stream into the recording format for the DVD audio 200. FIG. 8 is a diagram explaining this process of converting the compressed stream.

The information recording apparatus of the embodiment described below is an embodiment for recording the compressed stream onto a so-called stamper disc as a master (i.e., a cutting die) to mass-produce the DVD audio 200 on which the compressed stream is recorded (i.e., a disc manufacturing apparatus for manufacturing the stamper disc).

At first, the whole configuration and the operations of the information recording apparatus of the embodiment are described with reference to FIG. 4.

As shown in FIG. 4, an information recording apparatus R according to the embodiment is provided with: a master tape reproduction unit 70; a memory 71; a signal process unit 72 serving as a compressed audio information generating device, a first control information generating device and a second control information generating device; hard disc devices 73 and 74, a controller 75, a multiplexer 76, a modulation & ECC (Error Correction Code) addition unit 77 and a mastering device 78 serving as a recorder.

The operations will be described below.

The master tape reproduction unit 70 reproduces a master tape which records thereon the audio information (which is the non-compressed audio information) R to be recorded onto the DVD audio 200, and then outputs the audio information R to the signal process unit 72 in accordance with a request from the signal process unit 72.

Next, the signal process unit 72 applies an A/D conversion onto the audio information R outputted by the master tape reproduction unit 70 and then variable-length-compresses it by using a variable length compression method shown in FIG. 5 and FIG. 6 to thereby output it as the compressed stream Sr. At this time, one portion of the control information to control the reproduction of the compressed stream Sr is generated by the signal process unit 72 as the control information signal Si, which is described on a cue sheet ST in advance, is inputted through the memory 71. Other portion of the control information is generated by the signal process unit 72 on the basis of the data amount of the audio information R which is actually generated and compressed. The control information is multiplexed on the compressed audio information, to be outputted as the compressed stream Sr. After that, the outputted compressed stream Sr is transiently stored in the hard disk device 73.

Further, in parallel with this, in accordance with the cue sheet ST in which the control information to control the reproduction of the audio information R is described, the memory 71 transiently stores therein the control information which is inputted in advance, and then outputs it as the control information signal Si in accordance with the request from the signal process unit 72. This control information signal Si actually includes the control information to be included in the SAPPT 204, the AMG 202 and the ATSI 211.

By this, in accordance with a time code Tt corresponding to the audio information R outputted by the master tape reproduction unit 70 and the control information signal Si outputted by the memory 71, the signal process unit 72 separates the control information to be included in the SAPPT 204, the AMG 202, the ATSI 211 and the like, from the control information included in the control information signal Si with referring to the time code Tt, and output it as the control information signal Snav corresponding to it. Then, the control information signal Snav is transiently stored in the hard disc device 74.

Then, the above-mentioned processes are executed for the whole audio information R.

Next, when the above-mentioned processes are ended for all the audio information R, the controller 75 reads out the compressed stream Sr from the hard disc device 73, and also reads out the control information signal Snav from the hard disc device 74. Then, in accordance with them, the controller 75 re-generates the addition information (e.g., the control information signal Snav) which independently includes the control information to be included in the SAPPT 204, the AMG 202, the ATSI 211 etc., and the PTS, the DTS, the SCR etc., to re-store it transiently in the hard disc device. 74. This process is executed by a fact that the contents of the PTS, the DTS, the SCR etc., are determined in accordance with the generation result of the compressed stream Sr.

Next, the controller 75 performs a time management on each operation of the signal process unit 72 and the hard disc devices 73 and 74, and then reads out an addition information signal Sa (corresponding to the addition information which is transiently recorded in advance) including the control information signal Snav and outputs it. The controller 75 also reads out the compressed stream Sr from the hard disc device 73 and outputs it, and further generates an information selection signal Scc for time-axis-multiplexing the compressed stream Sr and the addition information signal Sa, and outputs it.

After that, the multiplexer 76 time-axis-multiplexes the compressed stream Sr (including the compressed audio information) and the addition information signal Sa which are read out from the hard disc devices 73 and 74 respectively, in accordance with the information selection signal Scc from the controller 75, and outputs it as an information addition compression signal Sap. This process causes the control information to be included in the SAPPT 204, the AMG 202, the ATSI 211 etc., the PTS, DTS, SCR etc., and the private header 242 etc., to be multiplexed on the compressed stream Sr. Accordingly, the physical structure shown in FIG. 1 is completed as the audio information to be recorded onto the DVD audio disc.

After that, the modulation & ECC addition unit 77 performs an addition of an error correction code (ECC) such as a Reed-Solomon code, and also performs a modulation such as an 8-16 modulation on the outputted information addition compression signal Sap, and then generates a disc record signal Sm, and further outputs it to the mastering device 78.

Finally, the mastering device 78 records the disc record signal Sm onto the stamper disc. Then, the DVD audio 200 as a replica disc being typically marketed is manufactured by a replication apparatus (not shown) by using this stamper disc.

Next, the detailed portions of the above-mentioned processes of generating, from the record audio information R, the information addition compression signal Sap composed of the audio packs 230 will be described below with reference to FIGS. 5 to 8.

At first, the detailed portions of the generating processes from the record audio information R until the compressed stream Sr are described with reference to FIGS. 4 to 6.

Mainly in the process of generating the compressed stream Sr in the signal processor 72, the record audio information (actually, for example, the digital audio information based on a so-called linear PCM (Pulse Code Modulation) method) is firstly divided from a lead thereof for each predetermined sample number. Then, J (J: natural number) audio frames AF are generated (Step S1) (refer to a top stage and a second stage from the top in FIG. 6). At this stage, a serial number is given for each audio frame AF.

Next, each generated audio frame AF is divided into one or a plurality of blocks B, in accordance with an information amount of the audio information included in the audio frame AF and the like (Step S2) (refer to the second stage and a third stage from the top in FIG. 6). At this time, it may be divided such that the information amount of the audio information included in each block B is different for each block B. One block B does not stride over two audio frames AF. Moreover, at the stage of dividing into the block B, a so-called dummy information and the like are not inserted in order to adjust the division positions and the like.

Next, a variable length compression is applied onto each generated block B. Then, post-compression blocks CB are respectively generated after the compression (Step S3) (refer to the third stage and a fourth stage from the top in FIG. 6). At this time, in the compression process at the step S3, a so-called difference compression process indicating the data by using only a difference from the data immediately before is performed.

Here, at the step S3, the compression process is carried out by using a so-called two-path compression encoding method for once scanning the record audio information R within all the blocks B to be compressed, and thereby obtaining a data amount of all the blocks after the compression, and accordingly calculating a data amount in an FIFO (First In First Out) memory in the later-described information reproducing apparatus required to reproduce each block.

This calculation method is explained hereinbelow in detail.

One of the features of the compression method in the embodiment is that a transfer rate of data after the compression is allowed to exceed a transfer rate in a transmission system. More concretely, if the original record audio information before the compression is a linear PCM signal of 96 kHz/24 bit/6 ch, the data rate before the compression is 13.824 Mbps. Here, the compressing method in the embodiment is a reversible compression. Thus, there may be a case that the compression cannot be done at all, depending on an information amount included in the original record audio information. So, the execution of the compression does not have any meaning under such conditions. However, in a case of typical record audio information, a portion at which the compression cannot be substantially performed is a short period such as several msec. (milliseconds), and a frequency of the occurrence is also limited. For simple explanation, if non-compressible sections are assumed to be consecutive, the data rate of this section after the compression is 13.824 Mbps. On the other hand, the transfer rate of an audio stream defined in accordance with the DVD standard is 9.6 Mbps. Hence, under this situation, it is impossible to transmit the non-compressible sections. Therefore, in order to compensate a difference between the data rate and the transfer rate, it is desirable to equip the above-mentioned FIFO memory in the information reproducing apparatus.

More actually, if an FIFO memory having a memory capacity of 100K bytes is prepared, even if the sections in which the record audio information cannot be compressed are consecutive for 0.19 seconds, it can be transmitted at 9.6 Mbps as indicated by a following equation.

(100K×8 bits)/(13.824 Mbps−9.6 Mbps)=About 0.19 sec.

Even the non-compressible block B can be transmitted and reproduced by storing the data in the FIFO memory as mentioned above. To do so, it is desirable to determine a data amount in the FIFO memory required for the reproduction (namely, the data amount which should be stored in the FIFO memory at each time point), for all the blocks B. Then, this value is influenced by not only a data amount after the compression of each block B but also a data amount after the compression of a succeeding block B. Thus, the above-mentioned two-path compression encoding method is used which (i) once scans the record audio information R within all the blocks B to be compressed, (ii) obtains a data amount after the compression of all the blocks B, (iii) optimizes it as described later (refer to FIG. 13), (iv) again adjusts a data amount after a further compression of the block B, (v) simultaneously determines a data amount in the FIFO memory required for the reproduction, and (vi) accordingly carries out the actual compression process at a second time.

Next, K (K: natural number) restart blocks RB are generated from a restart header RH and a post-compression block CB corresponding to one or a plurality of audio frames AF (Step S4) (refer to the fourth stage and a fifth stage from the top in FIG. 6). Here, the restart block RB is assumed to be a minimum unit which can be independently reproduced in the later-described information reproducing apparatus.

Then, an FIFO output time (m) (0≦m≦K−1), which is a timing information indicative of a reproduction time (which is a time on a reproduction time axis when the audio information is outputted by the decoder in the later-described information reproducing apparatus to the external portion) of the first audio information in the first post-compression block CB within the restart block RB successive to the restart header RH is recorded within each restart header RH (Step S5) (refer to the fourth and fifth stages from the top in FIG. 6). At this time, of course, the FIFO output time (m) is supposed to agree with a reproduction time of the lead data of the audio frame AF. Thus, it is calculated by the signal processor 72 in accordance with the timing information in the control information signal Si, which is described in advance on the above-mentioned cue sheet ST, and the serial number of the audio frame AF corresponding to the first post-compression block CB within the restart block RB.

Next, J (J: natural number) access units AU are generated from a synchronization header MJ or a synchronization header MN and one or a plurality of post-compression blocks CB (including the restart header RH) corresponding to only one audio frame AF (Step S6) (refer to the fifth stage and a bottom stage from the top in FIG. 6). Accordingly, the access unit AU is generated which is constituted by only the audio information included in the one audio frame AF.

As shown in FIG. 6, as the synchronization header, there are two kinds of the synchronization header MJ and the synchronization header MN. In this embodiment, the synchronization header of contributing to the reproducing process at the unit of the restart block RB by inserting adjacent to the restart header RH is set as the synchronization header MJ. The synchronization header belonging to an access unit AU except for the first access unit AU composed of the synchronization header MJ and one or a plurality of post-compression blocks CB (including the restart header RH) corresponding to only one audio frame AF from the lead of one restart block. RB is set as the synchronization header MN. In this case, only the FIFO input time and the data amount of the compressed audio information included in the access unit AU to which the synchronization header MN belongs are described in the synchronization header MN. The FIFO input time is calculated and recorded at a later-described step S7.

Next, an FIFO input time (n) (0≦n≦J−1) indicative of a reproduction time on a reproduction time axis, when the access unit AU including each synchronization header MJ itself is inputted to the FIFO memory in the later-described information reproducing apparatus at the time of reproduction, is calculated and recorded in the synchronization headers MJ and MN (hereafter, both of them are representatively referred to as the synchronization header MJ) in the access unit AU generated at the step S6 (Step S7). The FIFO input time (n) is calculated with respect to the lead block B in the access unit AU. This value is calculated by using a following equation, in accordance with the data amount in the FIFO memory required for the reproduction of each block B determined at the step S3.

FIFO Input Time (n)=Tout−DA/Rin wherein

Tout: FIFO Output Time of Lead Block B in Access Unit AU

DA: Data Amount in FIFO Necessary for Reproduction of Lead Block B in Access Unit AU Rin: Input Data Rate of FIFO Memory Here, the FIFO output time of the lead block B in the access unit AU (i.e., the time Tout) implies a reproduction time of the lead data of an audio frame (n) corresponding to the access unit AU. The input data rate of the FIFO memory (i.e., the rate Rin) implies a transfer rate (9.6 Mbps) of the audio stream defined in accordance with the DVD standard.

Finally, the plurality of generated access units AU are arranged adjacently to each other, in its reproduction order. Then, the compressed stream Sr is generated (Step S8) (refer to the bottom stage in FIG. 6).

The above-mentioned processes at the steps S1 to S8 enable the compressed stream Sr to be generated from the original record audio information R.

The detailed portions of the generation processes from the compressed stream Sr until the information addition compression signal Sap composed of the audio packs 230 (hereafter, merely referred to as an "authoring process") will be described below with reference to FIGS. 4, 7 and 8.

In the authoring process mainly carried out by the controller 75 and the multiplexer 76, a parameter N-AC is firstly initialized which indicates the number of leads of the access units AU included in the division data 243 (Step S10).

Next, the generated compressed stream Sr is divided for each predetermined information amount set in advance correspondingly to the data amount in the compressed audio information included in a later-described audio packet, in such a way that the lead data of the access unit AU is always included in the audio pack 230, and then H (H: natural number) division data 243 are generated (Step S11) (refer to a top stage in FIG. 8). At this time, the data amounts of the compressed streams Sr included in the respective division data 243 are assumed to be identical to each other. After that, the audio pack 230 is to be finally generated for each division data 243.

A parameter n indicates the serial number of each audio frame AF included in the compressed stream Sr from a lead of the compressed stream Sr (in other words, the serial number of each access unit AU from the lead of the compressed stream Sr). A parameter N-FAC(n) indicates to which number of the audio frame AF the first access unit AU (which is the access unit AU whose lead data firstly appears in a division data 243, and whose final data may not be included in the same division data 243) in each division data 243 corresponds, when the audio frames AF are counted from the lead audio frame AF as for the whole compressed stream Sr. A parameter N-LAC (n) indicates in which number of the audio frame AF the end access unit AU (which is the end or final access unit among the access units AU, the lead data of each of which is included in one division data 243, and whose final data may not be included in the same division data 243) in each division data 243 is included, when the audio frames AF are counted from the lead audio frame AF as for the whole compressed stream Sr. In the Step S10, the parameter n, the parameter N-FAC(n) and the parameter N-LAC (n) are initialized as follows.

n=1
N-FAC(0)=0
N-LAC(0)=0

Also, a parameter OFFSET indicative of a difference in time between (i) a clock circuit for carrying out a clocking operation serving as a standard to note the above-mentioned DTS and PTS in the later-described information reproducing apparatus and (ii) a clock circuit for carrying out a clocking operation serving as a standard to note the FIFO output time and the FIFO input time in the same information reproducing apparatus is set to be a predetermined initial value (Step S12).

Next, the total number of lead access units AU included in the division data 243 targeted by the authoring process is calculated to then set its result as a value of a new parameter N-AC (Step S13).

Moreover, it is calculated to which number of the audio frame AF the audio frame AF, which corresponds to the first access unit AU in the targeted division data 243, corresponds (i.e., the serial number n from the lead of the compressed stream Sr is calculated) when calculating from the lead audio frame AF as for the whole compressed stream Sr, by using a following equation, and then its result is set as the parameter N-FAC(n) (Step S14).

$$N\text{-}FAC(n)=N\text{-}LAC(n-1)+1$$

Next, it is calculated to which number of the audio frame AF the audio frame AF, which corresponds to the end access unit AU in the targeted division data 243, corresponds (i.e., the serial number n from the lead of the compressed stream Sr is calculated) when calculating from the lead audio frame AF as for the whole compressed stream Sr, by using a following equation, and then its result is set as the parameter N-LAC(n) (Step S15).

$$N\text{-}LAC(n)=N\text{-}LAC(n-1)+N\text{-}AC$$

Next, the FIFO input time (n) in the synchronization header MJ of the first access unit AU in the targeted division data 243 is read out, and DTS corresponding to the first access unit AU in the division data 243 (i.e., the serial number n from the lead of the compressed stream Sr) is calculated by using a following equation. Then, it is set as DTS(n) (Step S16).

$$DTS(n)=\text{FIFO Input Time }(n)+\text{OFFSET}$$

Next, it is judged whether or not the value of the parameter n is "1" (Step S17). If the value is not "1" (Step S17: NO), it is determined that the targeted access unit AU is not the lead access unit AU as for the whole compressed stream Sr. Then, PTS of the first access unit AU in the targeted access unit AU is calculated by using a following equation. Then, it is set as PTS(n) (Step S18).

$$PTS(n)=PTS(1)+(N\text{-}FAC(n)-1)\times\Delta T$$

Wherein ΔT: Time Length of One Audio Frame AF

On the other hand, if it is judged in the judgment at the step S17 that the value of the parameter n is "1" (Step S17: YES), it is determined that the targeted access unit AU is the lead access unit AU as for the whole compressed stream Sr. Then, an FIFO output time (1) in the restart header RH of the access unit AU is read out, and PTS of the access unit AU by using the following equation is calculated by a following equation. Then, it is set as PTS(1) (Step S19).

$$PTS(1)=\text{FIFO Output Time }(1)+\text{OFFSET}$$

Then, when the PTS(n) or the PTS(1) is set, the PTS (n) (or PTS(1)) and the DTS(n) which are calculated until this time are inserted into a packet header 241 (Step S20). Since this PTS(n) (or PTS(1)) and the DTS(n) are inserted into the packet header 241, the PTS and the DTS of the access unit AU are not described except for the access unit AU, in which the lead in one audio packet PKT firstly appears in the one audio packet PKT. Next, by using the packet header 241 as well as the private header 242 and the division data 243 following the packet header 241, one audio packet PKT is generated (Step S21) (refer to a top stage and a second stage from the top in FIG. 8).

Next, the SCR is calculated which indicates a time when the transferring operation of the private header 242 and the succeeding division data 243, within the generated audio packet PKT, are started from the demultiplexer to the input buffer in the later-described information reproducing apparatus. Then, this SCR is inserted into the pack header 240 (Step S22). When this SCR is calculated, the value is determined such that it is synchronous with other streams without causing the overflow or underflow in the input buffer.

Then, the pack header 240 and one succeeding audio packet PKT are used to generate one audio pack 230 (Step S23) (refer to a second stage and a bottom stage from the top in FIG. 8). In the DVD audio 200 of the embodiment, only one audio packet PKT is included in one audio pack 230.

Then, it is checked whether there is a presence or absence of another kind of pack OP to be multiplexed other than the audio pack 230, when generating the information addition compression signal Sap (Step S24). If there is another kind of pack OP (Step S24: YES), the authoring process corresponding to another kind of pack OP is carried out (Step S25). Then, the operational flow proceeds to a step S26.

On the other hand, if it is judged in the judgment at the step S24 that there is not another kind of pack OP (Step S24: NO), the parameter n is compared with the value H (i.e., the total number H of division data 243 included in the whole compressed stream Sr) (Step S26). If they are equal to each other (Step S26: YES), it is determined that the authoring process is completed for all the division data 243. So, the process as the information recording apparatus R are ended. On the other hand, the parameter n and the value H are not equal to each other (Step S26: NO), it is determined that there remains a next division data 243 onto which the authoring process is to be applied. Then, the operational flow returns back to the step S13. After that, the processes until the step S25 are performed on this next division data 243.

The information addition compression signal Sap in which the various control information (e.g., the PTS, the DTS, the SCR etc.,) are described is generated from the compressed stream Sr, by the above-mentioned processes at the steps S10 to S26. After that, the modulator 77 and the mastering device 78 perform the above-mentioned respective processes on the information addition compression signal Sap. Accordingly, the master for the mass-production of the DVD audio 200 is manufactured.

As can be understood from the above-mentioned description, it is designed that the restart block RB corresponds to the plurality of audio frames AF and further the access unit AU corresponds to one audio frame AF. Thus, the FIFO output time and the PTS among the various control information agree with any one of the time appearing for each constant time interval (i.e., for the reproduction time of the audio frame) on the reproduction time axis.

The FIFO input time among the respective control information is determined with respect to the FIFO output time, so as to compensate the difference between the data rate in the transmission system and the data rate after the compression. Thus, it is possible to attain a value equal to or greater than the data rate in the transmission system to thereby realize the effective reversible compression.

Moreover, the SCR, the DTS and the PTS among the various control information have the values so that they are synchronous with other streams without the overflow or the underflow in the input buffer. Thus, they can be recorded on the DVD audio 200 as the stream based on the MPEG.

(II) Embodiment of Information Reproducing Apparatus

The embodiment of the information reproducing apparatus for reproducing the compressed stream Sr (audio information) recorded after the compression to the DVD audio 200 will be described below FIGS. 9 to 13.

Figure 9:
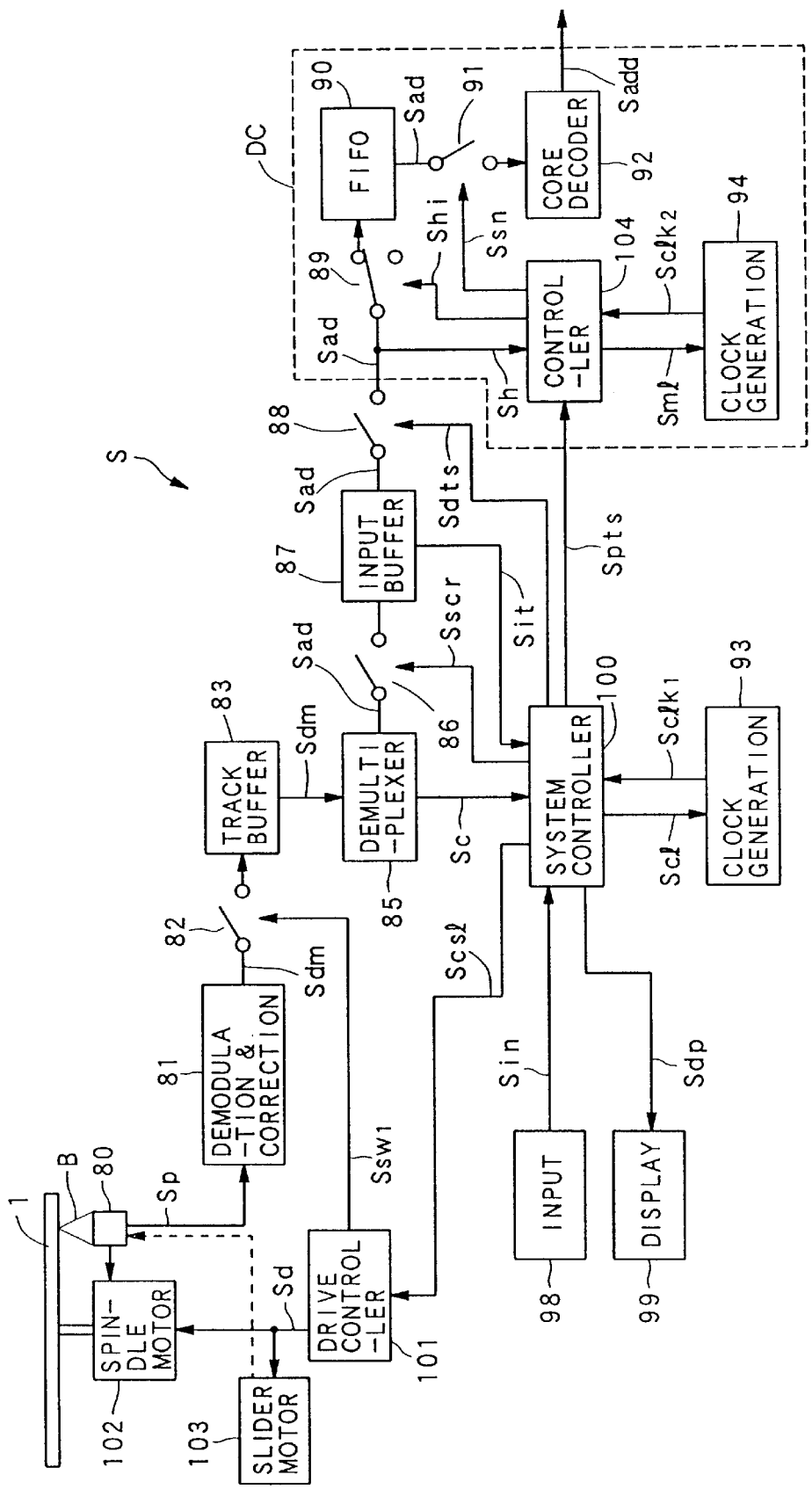
FIG. 9 is a block diagram showing a schematic configuration of an information reproducing apparatus in the embodiment.
Figure 10:
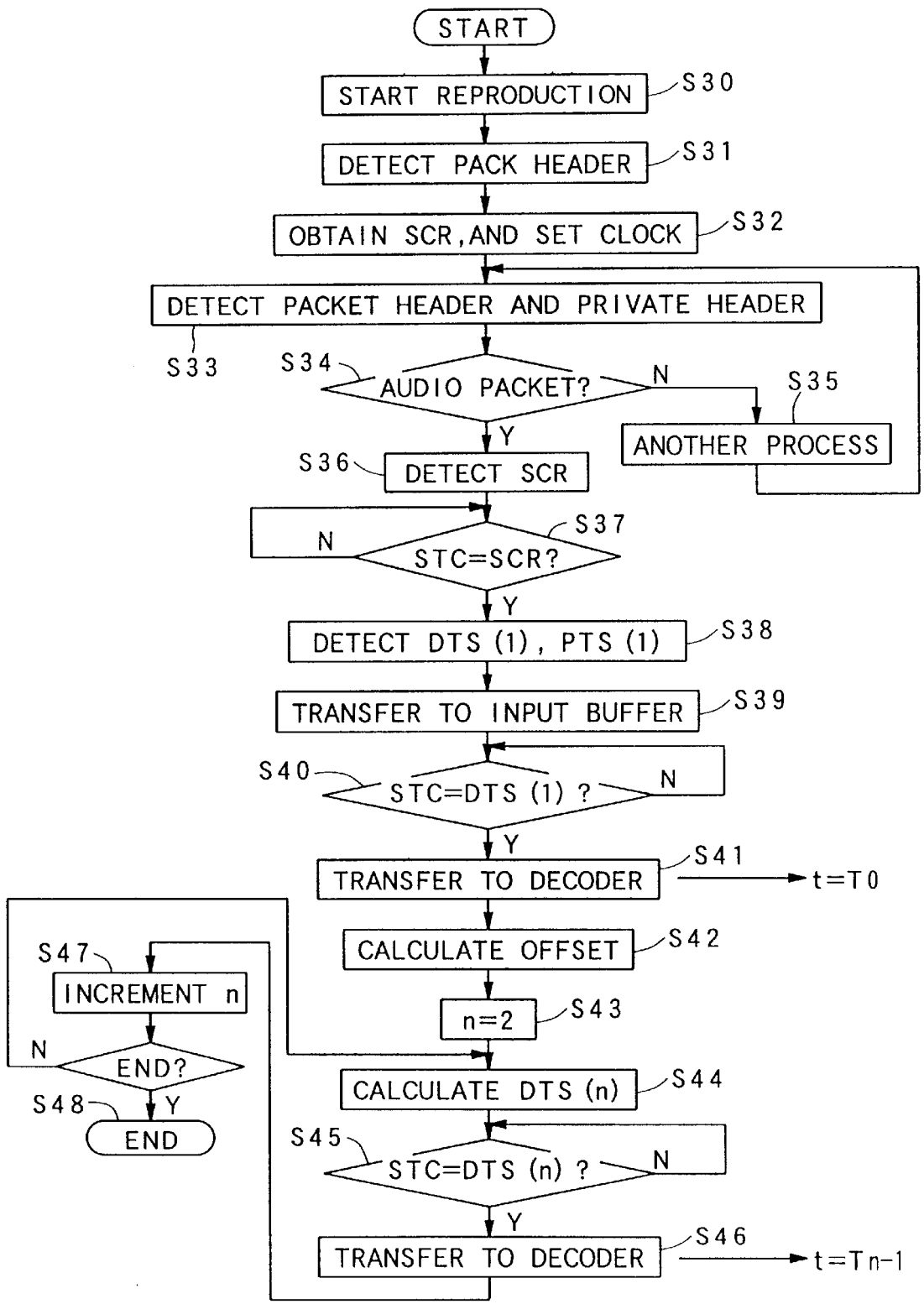
FIG. 10 is a flowchart showing a process of an input and output control of an input buffer in the embodiment.
Figure 11:
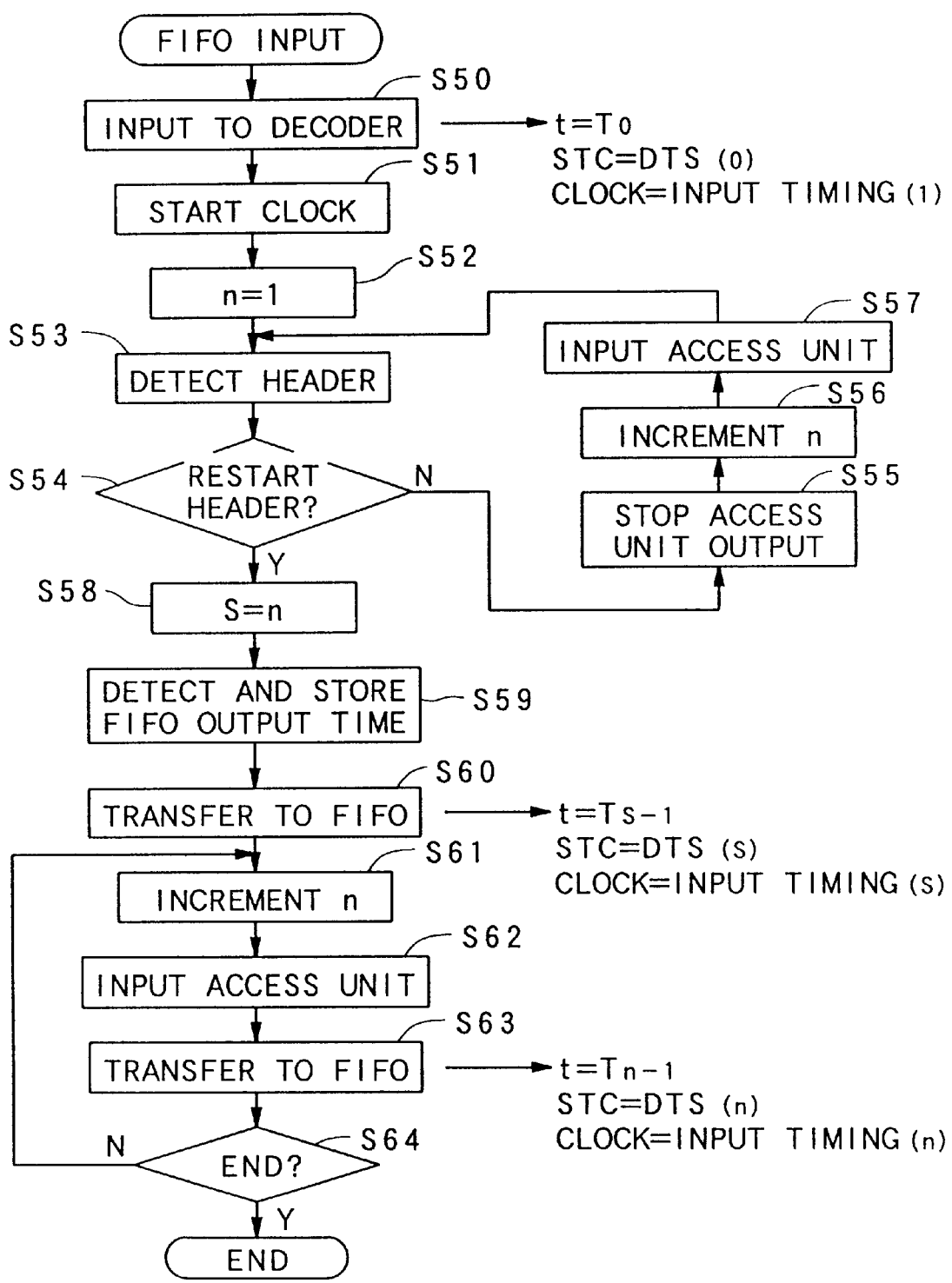
FIG. 11 is a flowchart showing a process of an input control of an FIFO memory in the embodiment.
Figure 12:
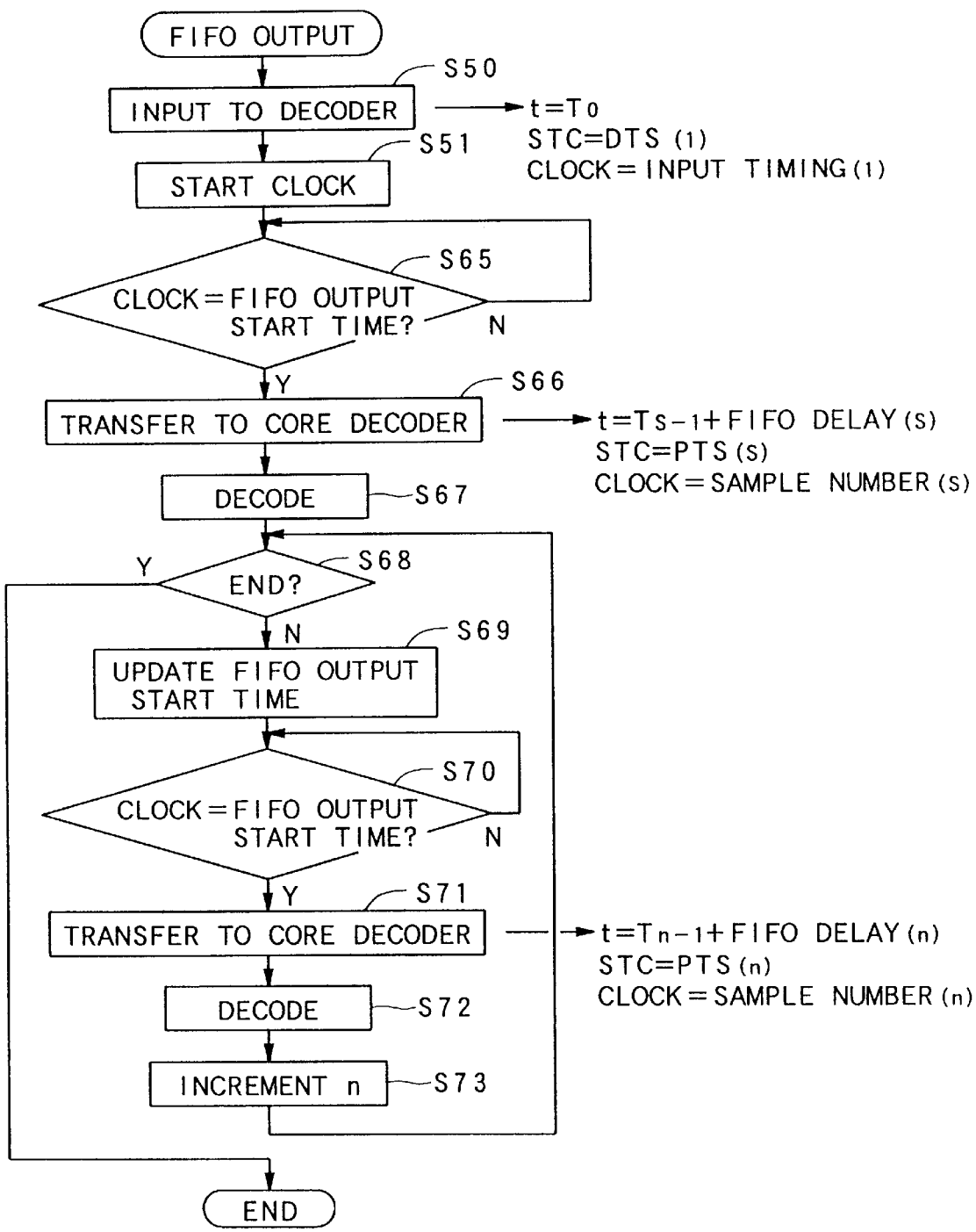
FIG. 12 is a flowchart showing a process of an output control of the FIFO memory in the embodiment.
Figure 13:
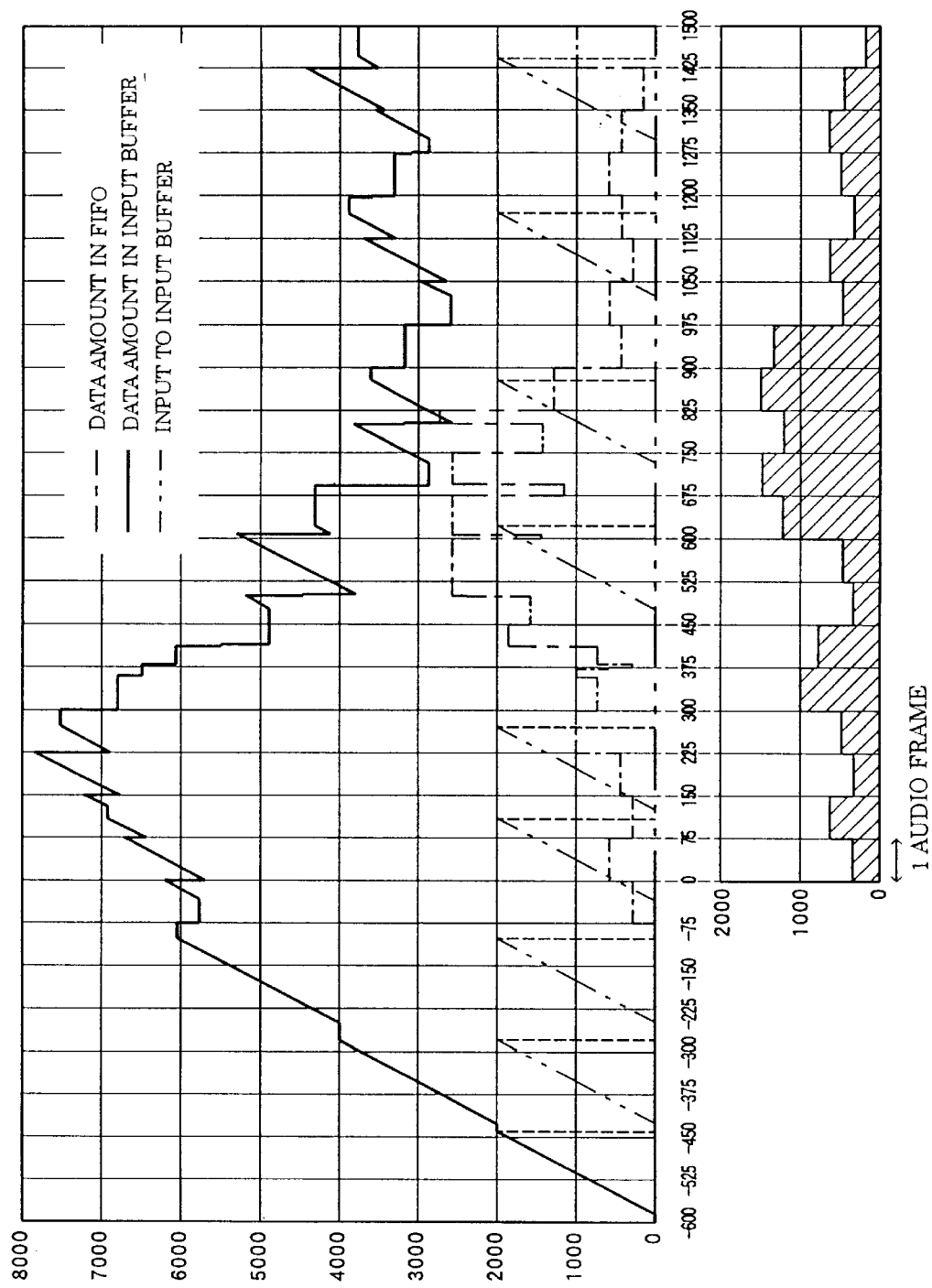
FIG. 13 is a timing chart exemplifying changes of input and output of data in the input buffer and the FIFO memory.

FIG. 9 is a block diagram showing the whole configuration of the information reproducing apparatus. FIGS. 10 to 12 are flowcharts showing the operations of the information reproducing apparatus in the embodiment. FIG. 13 is a timing chart explaining the temporal changes of the input and output of information in an FIFO memory and an input buffer described later.

At first, the whole configuration and the operations of the information reproducing apparatus in the embodiment are described with reference to FIG. 9.

As shown in FIG. 9, an information reproducing apparatus S according to the embodiment is provided with: an optical pickup 80; a demodulation & correction device 81; stream switches 82, 86 and 88; a track buffer 83; a demultiplexer 85; an input buffer 87 serving as a second buffer; a clock generation circuit 93; an input device 98; a display 99; a system controller 100 serving as a controller; a drive controller 101; a spindle motor 102; a slider motor 103; and a decoder DC.

The decoder DC is provided with: stream switches 89 and 91; an FIFO memory 90 serving as a first buffer; a core decoder 92 serving as a reproducing device; a clock generation circuit 94; and a controller 104 serving as a controller.

Only the sections with regard to the reproduction of the audio information in the information reproducing apparatus S are represented in the configurations shown in FIG. 9. The optical pickup 80 and a servo circuit for servo-controlling the spindle motor 102, the slider motor 103 and the like are similar to those of the conventional technology. Thus, their lists and detailed explanations are omitted.

Next, the operations will be described below.

The optical pickup 80 contains a laser diode, a beam splitter, an objective lens and a light detector (which are not shown) and the like, and then irradiates a light beam B as a reproduction light onto the DVD audio 200, and also receives a reflection light of the light beam B from the DVD audio 200, and further outputs a detection signal Sp corresponding to an information pit formed on the DVD audio 200. At this time, in such a way that the light beam B is accurately irradiated onto an information track on the DVD audio 200 and also a focal point is accurately generated on an information record surface on the DVD audio 200, a tracking servo control and a focus servo control are applied to the objective lens (not shown) by using a method similar to the conventional technology.

Next, the detection signal Sp outputted by the optical pickup 80 is inputted to the demodulation & correction device 81. Then, a demodulation (decoding) process and an error correction process are applied onto it to thereby generate a demodulation signal Sdm, which is outputted to the stream switch 82.

Then, in the stream switch 82 receiving the demodulation signal Sdm, the open and close operation thereof is controlled in accordance with a switch signal Ssw1 from the drive controller 101. If the stream switch 82 is closed, the input demodulation signal Sdm is passed therethrough as it is, and is outputted to the track buffer 83. On the other hand, if the stream switch 82 is opened, the demodulation signal Sdm is not outputted. Thus, unnecessary information (signal) is never inputted to the track buffer 83.

Next, the track buffer 83 to which the demodulation signal Sdm is inputted is composed of a FIFO (First In First Out) memory or the like. Then, it transiently stores the input demodulation signal Sdm, and outputs it to the demultiplexer 85.

Then, the demultiplexer 85 extracts the division data 243 for each audio pack 230 from the demodulation signal Sdm, and then outputs it as an audio signal Sad in succession when the stream switch 86 is closed.

In parallel with this, the demultiplexer 85 extracts the pack header 240, the packet header 241 and the like from each audio pack 230 and packet, and then outputs the DTS, the PTS and the SCR included in the respective headers as a header signal Sc to the system controller 100.

At a time of a start of a reproduction or immediately after an access, the SCR included in the read out first pack header 240 is used as a standard value, and is then outputted to the clock generation circuit 93 as a control signal Sc1 from the system controller 100.

Then, the clock generation circuit 93 sets as a standard a frequency of 90 kHz (or 27 MHz), which is standardized as a standard STC (System Time Clock) on an MPEG standard, and then makes the reproduction time indicated by the clock generation circuit 93 itself coincide with this standard value. After that, the system controller 100 compares a value of a clock signal Sclk1 indicative of a reproduction time of the clock generation circuit 93 with the values of the SCR, the DTS and the PTS in the header signal Sc, and then carries out a temporal management of the whole reproduction system.

In the stream switch 86 to which the audio signal Sad is inputted in succession, the open and close operation thereof is controlled in accordance with a switch signal Sscr from the system controller 100 so that the stream switch 86 is closed at a timing when the time described in the SCR inputted as the header signal Sc agrees with the reproduction time indicated by the clock signal Sclk1, and the stream switch 86 is again opened after the completion of the transfer of the audio signal Sad (division data 243) corresponding to the header signal Sc. This enables the control in which the decoding process in the decoder DC is not stopped by the overflow of the input buffer 87 or the empty condition.

Next, the input buffer 87 to which the audio signal Sad is inputted is composed of a FIFO memory or the like, and transiently accumulates the inputted audio signal Sad, and then outputs it to the decoder DC at the latter stage when the stream switch 88 is closed. At this time, the input buffer 87 extracts the FIFO input time from the synchronization header MJ in the audio signal Sad, and then outputs it to the system controller 100 as an input timing signal Sit.

Next, in the stream switch 88, the open and close operation thereof is controlled in accordance with a switch signal Sdts from the system controller 100 so that the stream switch 88 is closed at a reproduction time corresponding to the FIFO input time inputted as the input timing signal Sit and the DTS inputted as the header signal Sc and it is again opened after the transfer of the audio signal Sad (i.e., one access unit AU) corresponding to the FIFO input time and the DTS, as the audio signal Sad is outputted to the latter stage resulting from the above-mentioned close operation. At this time, the switch signal Sdts is outputted so as to close the stream switch 88 at a timing when a reproduction time indicated by the clock signal Sclk1 agrees with a reproduction time corresponding to the FIFO input time and the DTS, in accordance with the clock signal Sclk1 clocked by the clock generation circuit 93, similarly to the switch signal Sscr.

At this time, the system controller 100 refers to the time indicated by the clock signal Sclk1, in accordance with the SCR and the DTS inputted as the header signal Sc and the FIFO input time inputted as the input timing signal Sit, and then generates the switch signals Sscr and Sdts to thereby outputs them at the respective timings. This enables such a control that the decoding process is not stopped by the overflow of the input buffer 87 or the empty condition which are caused by the mutual action between the stream switches 88 and 86.

Moreover, the system controller 100 generates a PTS signal Spts corresponding to the PTS inputted as the header signal Sc, and then outputs it to the controller 104 in the decoder DC.

In addition, the input and output control of the input buffer 87 through the stream switches 86 and 88 is similar to the conventional input and output control carried out when non-compressed audio information is recorded onto and reproduced from the DVD audio 200, except for the utilization of the FIFO input time.

The information, such as an instruction and the like, required for the execution of the above-mentioned processes in the system controller 100 is inputted by an audience through the input device 98, and is inputted to the system controller 100 as an input signal Sin. Moreover, the operational situation of the system controller 100 etc., is outputted through a display signal Sdp to be displayed on the display 99 composed of a liquid crystal display and the like.

Next, the decoder DC applying the expanding or decompressing process (which is an inversion process of the compressing process performed by the information recording apparatus) and the demodulating or decoding process (which is an inversion process of the modulating or encoding process performed by the information recording apparatus) corresponding to the later-described variable length compression (refer to the Step S3 in FIG. 5) and the like, on the audio signal Sad outputted in this way, and then outputs it as a demodulation audio signal Sadd to a speaker (not shown) or the like.

At a time of starting the reproduction or immediately after accessing, the controller 104 receives the various header information in the inputted audio signal Sad as a header signal Sh, and then extracts the FIFO input time from the first synchronization header MJ in the header signal Sh, and further outputs it to the clock generation circuit 94 as a control signal Sml, with the extracted value as a standard value.

Then, the clock generation circuit 94 sets a sampling frequency of the original record audio information to be a standard, and makes the reproduction time indicated by the clock generation circuit 94 itself coincide with this standard value. Here, the timing of the execution of this process is a timing when the coincidence between the DTS and the reproduction time of the clock generation circuit 93 causes the stream switch 88 to be closed by the system controller 100 and the audio signal Sad is outputted to the latter stage. Thus, this implies that the clock generation circuits 93 and 94 are synchronous with each other at this point. That is, a timing when the reproduction time of the clock generation circuit 93 and the DTS coincide with each other agrees with a timing when the FIFO input time described in the synchronization header MJ included in the access unit AU coincides with the reproduction time of the clock generation circuit 94, with regard to the access unit AU to be firstly processed. After that, the system controller 104 compares the value of a clock signal Sclk2 indicative of the reproduction time of the clock generation circuit 94 with the value of the PTS signal Spts corresponding to the PTS outputted by the system controller 100 and the FIFO output time and the FIFO input time in the header signal Sh, to thereby carry out a temporal management of the decoder DC.

In succession, the controller 104 detects the restart header RH from the header signal Sh. At this point, the stream switch 89 is always closed in accordance with a switch signal Shi from the system controller 104. After that, the audio signal Sad inputted only by the open and close operation of the stream switch 88 is inputted to the FIFO memory 90 as it is. Although the detailed portion will be described later, the stream switches 88 and 89 can control the same control even if they are opened and closed at the same time.

Next, the FIFO memory 90 to which the audio signal Sad is inputted transiently accumulates the inputted audio signal Sad, and continuously outputs it when the stream switch 91 is closed.

In the stream switch 91 to which the audio signal Sad is continuously outputted, the open and close operation thereof is controlled in accordance with a switch signal Ssn from the system controller 104 so that the stream switch 91 is closed at the time described in the PTS inputted as the PTS signal Spts and the FIFO output time inputted as the header signal Sh. Then, the audio signal Sad is outputted to the core decoder 92. In this case, the switch signal Ssn is outputted so as to close the stream switch 91, at a timing when the time corresponding to the PTS and the FIFO output time agrees with the reproduction time indicated by the clock signal Sclk2, in accordance with the clock signal Sclk2 clocked by the clock generation circuit 94.

At this time, the system controller 104 refers to the time indicated by the clock signal Sclk2, in accordance with the PTS, the FIFO output time and the FIFO input time inputted as the header signal Sh, and then generates and outputs the switch signals Ssn.

This enables such a control that the expanding process and the demodulating process in the core decoder 92 are not stopped by the overflow of the FIFO memory 90 or the empty condition which are caused by the mutual action between the stream switches 88, 86 and 91 as the system controllers 100 and 104 are synchronized.

By these, the core decoder 92 to which the audio signal Sad is inputted applies the expanding process, the demodulating process and the like on the audio signal Sad, and then outputs it as the demodulation audio signal Sadd to an external speaker (not shown) and the like.

Next, the reproducing process in the above-mentioned information recording apparatus S will be described below in detail with reference to FIGS. 10 to 13, mainly as for the inputting and outputting control for the input buffer 87 and the FIFO memory 90.

At first, the reproducing process mainly as for the inputting and outputting control by the system controller 100 with respect to the input buffer 87 is described with reference to FIG. 10.

In the inputting and outputting control for the input buffer 87, at first, when a reproduction is started (Step S30), the pack header 240 is read from the demodulation signal Sdm in the track buffer 83 (Step S31), and the SCR in the pack header 240 is read therefrom. Then, the clocking in the clock generation circuit 93 is set for the SCR (Step S32).

Next, the packet header 241 and the private header 242 are read from the demodulation signal Sdm (Step S33). Then, it is judged whether or not the read packet header 241 and private header 242 indicate that a packet including the already-read pack header 240 is the audio packet PKT (Step S34). If the packet is not the audio packet PKT (Step S34: NO), it instructs the decoder DC to carry out a demodulating process corresponding to the packet and the like (Step S35). In order to detect a next packet header 241 and private header 242, the operational flow returns back to the step S33.

On the other hand, if it is judged in the judgment at the step S34 that the packet to which the read packet header 241 and private header 242 correspond is the audio packet PKT (Step S34: YES), the SCR in the read pack header 240 is read (Step S36). Then, it is judged whether or not a reproduction time of the clock generation circuit 93 i.e., a clocking indicated by the clock signal Sclk1 (hereafter, this clocking is referred to as the STC) becomes the SCR stored in the memory (Step S37). If the reproduction time does not become the SCR (Step S37: NO), the operational flow waits for the coincidence between the STC and the SCR as it is. On the other hand, if they coincide with each other (Step S37: YES), the DTS(1) and the PTS(1) in the packet header 241 are immediately read out (the reason why the parameter n is "1" is that a process corresponding to the lead audio frame AF in the audio signal Sad is currently carried out). This is transiently stored in the memory (not shown) in the system controller 100 as the header signal Sc (Step S38). In succession, the switch signal Sscr is outputted and the stream switch 86 is closed, so as to transfer the division data 243 and the private header 242 included in the audio packet PKT as the audio signal Sad to the input buffer 87 (Step S39). The above-mentioned processes are repeated during the reproduction of the demodulation signal Sdm, as the process on the input side of the input buffer 87.

Next, as the process on the output side of the input buffer 87, it is checked whether or not the clocking STC indicated by the clock signal Sclk1 becomes the DTS(1) stored in the memory (Step S40). If the STC does not become the DTS(1) (Step S40: NO), the operational flow waits for the coincidence between the STC and the DTS(1) as it is. If they coincide with each other (Step S40: YES), the switch signal Sdts is outputted and the stream switch 88 is closed, so as to immediately transfer to the decoder DC the first access unit AU in the division data 243 as the audio signal Sad (Step S41).

Here, an absolute time t when this process is carried out is assumed to be T0. (At this time, the timing when the stream switch 88 is opened is a time point at the completion of the transfer of the access unit AU. However, in a typical operation model of the MPEG method, it is considered that the transfer of the access unit AU is completed at a moment notice. Thus, under the assumption of this operation model, it is said that the time when the stream switch 88 is closed is substantially equal to the time when it is opened. Hence, also in this case, it is considered that the closing time is substantially equal to the opening time in each of the stream switches 88, 89 and 91, in accordance with this operation model, and the transfer of the access unit is completed immediately.)

Next, the FIFO input time inputted as the input timing signal Sit is read out to then calculate the parameter OFFSET at that time by using a following equation (Step S42).

OFFSET=$DTS$(1)−FIFO Input Time(1)

Then, the parameter n is set to "2" (Step S43). Next, the FIFO input time (n) of the $n^{th}$ access unit AU among the access units AU in the audio signal Sad is read out to then calculate a corresponding DTS(n) by using a following equation (Step S44).

$DTS$(n)=FIFO Input Time(n)+OFFSET

Next, it is checked whether or not the STC becomes the calculated DTS(n) (Step S45). If the STC does not become the DTS(n) (Step S45: NO), the operational flow waits for the coincidence between the STC and the DTS(n) as it is. On the other hand, if they coincide with each other (Step S45: YES), the switch signal Sdts is outputted and the stream switch 88 is closed, so as to immediately transfer to the decoder DC the nth access unit AU in the audio signal Sad (Step S46). At this time, an absolute time t when this process is carried out is assumed to be Tn Here, the DTS actually described in the audio pack 230 only defines the time when the first access unit AU in the audio pack 230 (i.e., the access unit AU in which the lead data in the access units AU firstly appears in the audio pack 230) is outputted from the input buffer 87. Thus, the time when the access unit AU other than the first access unit AU in the audio pack 230 is to be outputted from the input buffer 87 is calculated in accordance with the above-mentioned processes. Then, it is necessary to carry out the process after this value is set as the DTS for each access unit AU.

Next, the parameter n is incremented (Step S47). It is judged whether or not the input of the audio signal Sad from the demultiplexer 85 is stopped (Step S48). If the input is not stopped (Step S48: NO), the operational flow returns back to the step S44, and applies the processes at the steps S44 to S47 on the next access unit AU. On the other hand, if the input is stopped (Step S48: YES), the process is ended as it is.

The above-mentioned processes shown in FIG. 10 enable the audio signal Sad to be transferred to the decoder DC without the overflow or the underflow in the input buffer 87. That is, the overflow or the underflow does not occur in the input buffer 87, if the inputting and outputting control of the read audio signal Sad with respect to the input buffer 87 is carried out in accordance with the control information recorded on the DVD audio 200. Thus, it is said that such control information is recorded on the DVD audio 200.

Next, the reproducing process will be described below with reference to FIGS. 11 and 12, mainly as for the inputting and outputting control of the controllers 100 and 104 with respect to the FIFO memory 90.

In addition, the inputting and outputting control for the FIFO memory 90 as described below is temporally carried out in parallel with the above-mentioned inputting and outputting control for the input buffer 87.

At first, the inputting control for the FIFO memory 90 is described with reference to FIG. 11.

In the inputting control for the FIFO memory 90, the first access unit AU as the audio signal Sad is firstly inputted to the decoder DC (Step S50). Here, an absolute time t when this process is carried out is the above-mentioned $T_0$. This process is carried out simultaneously with that of the step S41 of FIG. 10.

Next, the FIFO input time (1) is read out from the synchronization header MJ in the audio signal Sad. The clocking in the clock generation circuit 94 is set to a value of the FIFO input time (1). Then, the clocking of the clock signal Sclk2 in the clock generation circuit 94 is started (Step S51). In addition, the above-mentioned STC when the process at the step S50 is carried out is equal to the DTS(1). Moreover, the clocking in the clock generation circuit 94 at the same time is equal to a time indicated by the FIFO input time (1). At this point, the clock generation circuits 93 and 94 are synchronous with each other. Thus, after that, the controllers 100 and 104 are driven in synchronization with each other.

Next, the parameter n is set to "1" (Step S52) and the lead header of the access unit AU is detected (Step S53). Then, it is judged whether or not the detected header is the restart header RH (Step S54). If the detected header is not the restart header RH (Step S54: NO), the access unit AU is not transferred to the FIFO memory 90 (Step S55), and the parameter n is incremented (Step S56). Then, an access unit AU corresponding to a value of the incremented parameter n is received through the stream switch 88 (Step S57). Then, the operational flow returns to the step S53.

On the other hand, if the detected header is the restart header RH (Step S54: YES), a new parameter s is established, whose value is set equal to that of the parameter n (Step S58). Then, an FIFO output time (s) in the restart header RH of the $s^{th}$ access unit AU is read out to set the output start time of the $s^{th}$ access unit AU in the FIFO memory 90 to be a value of the FIFO output time (s). This is stored in a memory (not shown) in the controller 104 (Step S59).

Next, the switch signal Shi is outputted so as to transfer the $s^{th}$ access unit AU to the FIFO memory 90. Then, the stream switch 89 is switched to the side of the FIFO memory 90 (Step S60).

The absolute time t when the process at the step S60 is carried out is $T_{s-1}$. This time is equal to that of the transfer of the $s^{th}$ access unit at the step S46 in FIG. 10. Thus, the above-mentioned STC is equal to DTS(s). Moreover, the clocking in the clock generation circuit 94 is equal to the time indicated by the FIFO input time (s). Thus, after that, the operations of the controllers 100 and 104, which are synchronous with each other, agree with each other. That is, this implies that the absolute time when the access unit AU is outputted from the input buffer 87 under the control of the system controller 100 agrees with the absolute time when the access unit AU is inputted to the FIFO under the control of the controller 104.

Accordingly, the same result is obtained in the case when both the controllers 100 and 104 respectively open and close the stream switches 88 and 89 at the same time to carry out the above-mentioned control, and in the case when one of the stream switches is always closed and only the other stream switch is used to carry out the above-mentioned control.

Here, it is assumed that both the stream switches 88 and 89 are opened and closed at the same time. The establishment of the information to make the system controller 100 and the controller 104 synchronous with each other as mentioned above can attain such a flexibility or versatility that the decoder in relation to the MPEG and the decoder in relation to the compression can be designed independently of each other.

Next, the parameter n is incremented (Step S61). Moreover, when the access unit AU whose number is a value of the incremented parameter n is inputted through the stream switch 88 (Step S62), the switch signal Shi is outputted so as to transfer the access unit AU to the FIFO memory 90. Then, the stream switch 89 is switched to the side of the FIFO memory 90 (Step S63).

Here, the absolute time t when the process at the step S63 is carried out is $T_{n-1}$. This time is equal to that of the process at the step S46 in FIG. 10. Also, the above-mentioned STC is equal to the DTS(n). Moreover, the clocking in the clock generation circuit 94 is equal to the time indicated by the FIFO output time (n).

Then, it is judged whether or not the input of the audio signal Sad from the stream switch 88 is stopped (Step S64). If the input is not stopped (Step S64: NO), the operational flow returns back to the step S61. Then, the above-mentioned processes at the steps S61 to S63 are repeated for a next access unit AU. On the other hand, if the input is stopped (Step S64: YES), the process is ended as it is.

Next, the output control of the FIFO memory 90, the demodulating process in the core decoder 92 and the like will be described below with reference to FIG. 12.

In the output control to the FIFO memory 90, the processes at the steps S50 and S51 shown in FIG. 11 are firstly carried out similarly to the case of FIG. 11. The FIFO input time (1) is read out from the synchronization header MJ in the inputted audio signal Sad. The clocking in the clock generation circuit 94 is set to a value of the FIFO input time (1). Then, the clocking of the clock signal Sclk2 in the clock generation circuit 94 is started (Step S51).

Next, it is checked whether or not the clocking of the clock signal Sclk2 becomes an output start time of the sth access unit AU stored in the memory (not shown) at the step S59 shown in FIG. 11 (Step S65). If the clocking does not become the output start time (Step S65: NO), the operational flow waits for the output start time. If the clocking is the output start time (Step S65: YES), the switch signal Ssn is outputted and the stream switch 91 is closed, so as to transfer the sth access unit AU from the FIFO memory 90 to the core decoder 92 (Step S66). Then, the sth access unit AU is expanded and demodulated, and is then outputted as the audio information to the external portion (Step S67).

The absolute time t when the process at the step S66 is carried out is $T_{s-1}$+FIFO Delay (s). Also, the above-mentioned STC is equal to the PTS(s). Moreover, the clocking in the clock generation circuit 94 is equal to the time indicated by the FIFO input time (s).

Then, it is judged whether or not the input of the audio signal Sad from the stream switch 88 is stopped (Step S68). If the input is stopped (Step S68: YES), the process is ended as it is. On the other hand, if the input is not stopped (Step S68: NO), the output start time stored in the memory (not shown) (refer to the step S59) is incremented by a time duration of one access unit AU (Step S69). Then, it is judged whether or not the incremented output start time agrees with the clocking of the clock signal Sclk2 (Step S70). If it does not become the output start time (Step S70: NO), the operational flow waits for the output start time.

On the other hand, if the clocking of the clock signal Sclk2 becomes equal to a new output start time (Step S70: YES), the switch signal Ssn is outputted and the stream switch 91 is closed, so as to transfer the access unit AU indicated by the current parameter n from the FIFO memory 90 to the core decoder 92. Then, the $n^{th}$ access unit AU is expanded and demodulated, and is outputted as the audio information to the external portion (Step S72). Moreover, the parameter n is incremented (Step S73). Then, the operational flow returns back to the step S68. Again, the processes at the step S68 to S73 are carried out.

The absolute time t when the process at the step S71 is carried out is $T_{n-1}$+FIFO Delay (n). Also, the above-mentioned STC is equal to the PTS(n). Moreover, the clocking in the clock generation circuit 94 is equal to the time indicated by the FIFO output time (n).

The above-mentioned processes shown in FIGS. 11 and 12 enable the audio signal Sad to be transferred to the core decoder 92 without the overflow or the underflow in the FIFO memory 90.

Next, temporal changes of information amounts (data amounts) in the input buffer 87 and the FIFO memory 90 as the result of the execution of the inputting and outputting controls shown in FIGS. 10 to 12 will be schematically described below with reference to FIG. 13.

In FIG. 13, a solid line represents a data amount in the input buffer 87, a chain line represents a data amount in the FIFO memory 90, and a two-dot chain line represents a data input amount to the input buffer 87.

A bar graph in a lower right corner represents a data amount in each audio frame AF viewed on the same time axis as the polygonal line graph.

Moreover, "1000" on the Y axis in each figure corresponds to a maximum transfer rate of 9.6 Mbps in a transmission system (namely, a system for detecting the compressed stream from the DVD audio 200).

The execution of the above-mentioned inputting and outputting controls enables the data to be accumulated in the FIFO memory 90 before the data amount after the compression of each audio frame AF exceeds "1000" (i.e., the maximum transfer rate of 9.6 Mbps).

Then, in order to store the information in the FIFO memory 90 of the decoder DC immediately before a peak of the data amount after the compression exceeds 9.6 Mbps, it is necessary to recognize that a peak rate in the future exceeds 9.6 Mbps.

For this reason, as mentioned above, when the block B in the embodiment is compressed, the two-path compression encoding method is used to obtain the future information to then compress it. Also in this case, the compressing process in a compression manner suitable for the audio information and a process of expanding and demodulating it can be carried out by storing the data in the FIFO memory 90, from the viewpoint of expectation of the data amount outputted at a rate higher than 9.6 Mbps from the FIFO memory 90 in the future. As a result, the compression efficiency is improved to thereby increase the amount of the audio information that can be recorded on the DVD audio 200 and also improve the accessibility.

As mentioned above, according to the operations of the DVD audio 200, the information recording apparatus R and the information reproducing apparatus S, the record audio information R before the compression is recorded after the execution of the variable length compression. Thus, even the record audio information whose reproduction is carried out for long hours can be recorded on the DVD audio 200.

Also, the SCR, the PTS and the DTS corresponding to the record format to the DVD audio 200, and the FIFO input time and the FIFO output time corresponding to the compressing process are all recorded. Thus, even if (i) the detection of the compressed stream Sr from the DVD audio 200 and (ii) the expanding process and the demodulating process of the detected compressed stream Sr are respectively carried out by using individual information reproducing apparatuses, they can be easily carried out by respectively using the SCR, the PTS and the DTS, and the FIFO input time and the FIFO output time.

Moreover, the SCR, the PTS and the DTS, and the FIFO input time and the FIFO output time can be used to surely control the inputting and outputting operations of the input buffer 87 and the FIFO memory 90.

Since the compressed data in the access unit AU corresponds to the audio frame AF of the raw record audio information, the interval of the reproduction time of the access unit AU is constant so that the PTS and the FIFO output time have the constant interval. That is, in the inputting and outputting control of the data in the FIFO memory 90 and the input buffer 87, there is no limitation on the various control information except for the output time of the data from the FIFO memory 90. Thus, the data amount in the access unit AU can be made variable. So, it is not necessary to insert into the compressed stream Sr the dummy information used to make the data amount in the access unit AU constant. Hence, the compressed stream Sr can be recorded on the DVD audio 200 without increasing a redundancy by using an additional information. As a result, the compressed stream Sr of long hours can be recorded on the DVD audio 200.

The temporal interval when the access unit AU is transferred from the input buffer 87 to the FIFO memory 90 can be freely established in a range of a limitation on the transfer rate (if the temporal interval of the transfer of the access unit AU is constant, a size of the access unit AU is naturally constant by the condition of the constant interval, in the case of transferring data at the maximum transfer rate of 9.6 Mbps). As a result, the compressed stream of long hours can be recorded on the DVD audio 200, similarly to the case that the data amount in the access unit AU is variable.

The establishment of the information to make the decoder in relation to the MPEG and the decoder in relation to the compression synchronous with each other can attain the free degree at which they can be designed independently of each other.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.10-336396 filed on Nov. 26, 1998 including the specification, claims, drawings and summary is incorporated herein by reference in its entirety.

What is claimed is:

1. An information recording medium on which record information is recorded, the record information comprising a plurality of information units each including header information and divided-compressed audio information obtained by dividing compressed audio information so as to include one or a plurality of lead data positioned at a lead of compressed partial audio information, the compressed partial audio information being generated by variable-length-compressing partial audio information obtained by dividing raw audio information into a plurality of the partial audio information and by multiplexing the variable-length-compressed partial audio information with compression control information, the compressed audio information being generated by arranging the compressed partial audio information in an order of reproduction, wherein the compression control information includes first control information to control an inputting and outputting operation of the compressed partial audio information with respect to a first buffer, which is used when reproducing the compressed audio information, and the header information includes second control information to control an inputting and outputting operation of the divided-compressed audio information with respect to a second buffer, which is used when reproducing the compressed audio information.

2. An information recording medium according to claim 1, wherein the first control information comprises:

first input time information multiplexed for each of all the compressed partial audio information and indicating a time on a reproduction time axis of the compressed audio information when the compressed partial audio information, to which the first control information belongs, is to be inputted into said first buffer; and first output time information multiplexed for each of at least one or a plurality of the compressed partial audio information and indicating a time on the reproduction time axis of the compressed audio information when the compressed partial audio information, to which the first control information belongs, is to be outputted from said first buffer.

3. An information recording medium according to claim 1, wherein the second control information comprises:

second input time information indicating a time on a reproduction time axis of the record information when the divided-compressed audio information, which is included in the information unit together with the second control information, is to be inputted into said second buffer;

second output time information indicating a time on the reproduction time axis of the record information when the compressed partial audio information, to which first lead data among lead data each positioned at a lead of one or a plurality of the compressed partial audio information included in the divided-compression audio information included in the information unit together with the second control information belongs, is to be outputted from said second buffer; and third output time information indicating a time on the reproduction time axis of the record information when each of the compressed partial audio information is to be outputted from said first buffer.

4. An information recording medium according to claim 1, wherein the first buffer is a FIFO memory in an audio decoder and the second buffer is an input buffer which is located before the audio decoder.

5. An information recording medium according to claim 1, wherein the compression control information is recorded in the lead data.

6. An information recording apparatus for recording record information onto an information recording medium, the record information comprising a plurality of information units each including header information and divided-compressed audio information obtained by dividing compressed audio information so as to include one or a plurality of lead data positioned at a lead of compressed partial audio information, the compressed partial audio information being generated by variable-length-compressing partial audio information obtained by dividing raw audio information into a plurality of the partial audio information and by multiplexing the variable-length-compressed partial audio information with compression control information, the compressed audio information being generated by arranging the compressed partial audio information in an order of reproduction, said information recording apparatus comprising:

a compressed audio information generating device for generating the compressed audio information;

a first control information generating device for generating first control information to control an inputting and outputting operation of the compressed partial audio information with respect to a first buffer, which is used when reproducing the compressed audio information;

a second control information generating device for generating second control information to control an inputting and outputting operation of the divided-compressed audio information with respect to a second buffer, which is used when reproducing the compressed audio information; and a recording device for recording the first control information and the second control information together with the compressed audio information onto said information recording medium after multiplexing the first control information in the compression control information and multiplexing the second control information in the header information.

7. An information recording apparatus according to claim 6, wherein the first buffer is a FIFO memory in an audio decoder and the second buffer is an input buffer which is located before the audio decoder.

8. An information recording apparatus according to claim 6, wherein the compression control information is recorded in the lead area.

9. An information reproducing apparatus for reproducing compressed audio information in accordance with first control information and second control information, from an information recording medium on which record information is recorded, the record information comprising a plurality of information units each including header information and divided-compressed audio information obtained by dividing the compressed audio information so as to include one or a plurality of lead data positioned at a lead of compressed partial audio information, the compressed partial audio information being generated by variable-length-compressing partial audio information obtained by dividing raw audio information into a plurality of the partial audio information and by multiplexing the variable-length-compressed partial audio information with compression control information, the compressed audio information being generated by arranging the compressed partial audio information in an order of reproduction, wherein the compression control information includes the first control information to control an inputting and outputting operation of the compressed partial audio information with respect to a first buffer, which is used when reproducing the compressed audio information, and the header information includes the second control information to control an inputting and outputting operation of the divided-compressed audio information with respect to a second buffer, which is used when reproducing the compressed audio information, said information reproducing apparatus comprising:
- a detecting device for detecting the compressed audio information, the first control information and the second control information respectively from said information recording medium;
- the first buffer;
- the second buffer;
- a controlling device for controlling said second buffer to temporarily store and output the divided-compressed audio information in accordance with the detected second control information, and controlling said first buffer to temporarily store and output the compressed partial audio information outputted from said second buffer in accordance with the detected first control information; and
- a reproducing device for applying an expanding process corresponding to the compressing process with respect to the compressed-partial audio information outputted from said first buffer to thereby output the partial audio information.

10. An information reproducing apparatus according to claim 9, wherein the first buffer is a FIFO memory in an audio decoder and the second buffer is an input buffer which is located before the audio decoder.

11. An information reproducing apparatus according to claim 9, wherein the compression control information is recorded in the lead area.

12. An information recording method for recording record information onto an information recording medium, the record information comprising a plurality of information units each including header information and divided-compressed audio information obtained by dividing compressed audio information so as to include one or a plurality of lead data positioned at a lead of compressed partial audio information, the compressed partial audio information being generated by variable-length-compressing partial audio information obtained by dividing raw audio information into a plurality of the partial audio information and by multiplexing the variable-length-compressed partial audio information with compression control information, the compressed audio information being generated by arranging the compressed partial audio information in an order of reproduction, said method comprising:

(a) generating the compressed audio information;

(b) generating first control information to control an inputting and outputting operation of the compressed partial audio information with respect to a first buffer, which is used when reproducing the compressed audio information;

(c) generating second control information to control an inputting and outputting operation of the divided-compressed audio information with respect to a second buffer, which is used when reproducing the compressed audio information; and (d) recording the first control information and the second control information together with the compressed audio information onto said information recording medium after multiplexing the first control information in the compression control information and multiplexing the second control information in the header information.

13. An information recording method according to claim 12, wherein the first buffer is a FIFO memory in an audio decoder and the second buffer is an input buffer which is located before the audio decoder.

14. An information recording method according to claim 13, wherein the compression control information is recorded in the lead data.

15. An information reproducing method for reproducing compressed audio information in accordance with first control information and second control information, from an information recording medium on which record information is recorded, the record information comprising a plurality of information units each including header information and divided-compressed audio information obtained by dividing the compressed audio information so as to include one or a plurality of lead data positioned at a lead of compressed partial audio information, the compressed partial audio information being generated by variable-length-compressing partial audio information obtained by dividing raw audio information into a plurality of the partial audio information and by multiplexing the variable-length-compressed partial audio information with compression control information, the compressed audio information being generated by arranging the compressed partial audio information in an order of reproduction, wherein the compression control information includes the first control information to control an inputting and outputting operation of the compressed partial audio information with respect to a first buffer, which is used when reproducing the compressed audio information, and the header information includes the second control information to control an inputting and outputting operation of the divided-compressed audio information with respect to a second buffer, which is used when reproducing the compressed audio information, said information reproducing method comprising:

(a) detecting the compressed audio information, the first control information and the second control information respectively from said information recording medium;

(b) controlling said second buffer to temporarily store and output the divided-compressed audio information in accordance with the detected second control information, and controlling said first buffer to temporarily store and output the compressed partial audio information outputted from said second buffer in accordance with the detected first control information; and (c) applying an expanding process corresponding to the compressing process with respect to the compressed partial audio information outputted from said first buffer to thereby output the partial audio information.

16. An information reproducing method according to claim 15, wherein the first buffer is a FIFO memory in an audio decoder and the second buffer is an input buffer which is located before the audio decoder.

17. An information reproducing method according to claim 15, wherein the compression control information is recorded in the lead data.

* * * * *